US012747977B2

(12) United States Patent
Zur et al.

(10) Patent No.: US 12,747,977 B2
(45) Date of Patent: Sep. 29, 2026

(54) METHOD AND APPARATUS TO DETERMINE UTILITY USAGE

(71) Applicant: Arad Measuring Technologies Ltd., Yokneam Elit (IL)

(72) Inventors: Tal Zur, Yokneam (IL); Hagai Michaelis, Dalia (IL)

(73) Assignee: Arad Measuring Technologies Ltd., Yokneam Elit (IL)

( * ) Notice: Subject to any disclaimer, the term of this patent is extended or adjusted under 35 U.S.C. 154(b) by 277 days.

(21) Appl. No.: 18/483,119

(22) Filed: Oct. 9, 2023

(65) Prior Publication Data

US 2024/0118124 A1 Apr. 11, 2024

Related U.S. Application Data

(60) Provisional application No. 63/378,898, filed on Oct. 10, 2022.

(51) Int. Cl.
*G01F 25/10* (2022.01)
*G01F 15/063* (2022.01)

(52) U.S. Cl.
CPC ............ *G01F 25/10* (2022.01); *G01F 15/063* (2013.01)

(58) Field of Classification Search
CPC ........ G01F 25/10; G01F 15/063; G01F 1/662; G01F 1/667; G01F 25/15; G01F 25/00; G06N 20/00
USPC .... 73/1.16, 1.27, 1.28, 1.34, 861.42–861.48, 73/861.52–861.64, 861.77–861.79, 965.9, 73/865.8; 340/870.01, 870.02, 606, 609, 340/611, 637; 324/74, 500, 522, 324/531–533, 535, 555, 556, 110, 115, 324/116; 705/63
See application file for complete search history.

(56) References Cited

U.S. PATENT DOCUMENTS

| | | | |
|---|---|---|---|
| 5,994,892 | A | 11/1999 | Turino et al. |
| 6,538,577 | B1 | 3/2003 | Ehrke et al. |
| 7,228,726 | B2 | 6/2007 | Kates |
| 7,277,027 | B2 | 10/2007 | Ehrke et al. |
| 7,315,257 | B2 | 1/2008 | Patterson et al. |
| 7,412,876 | B2 | 8/2008 | Kates |
| 7,669,461 | B2 | 3/2010 | Kates |
| 7,772,989 | B2 | 8/2010 | Ehrke et al. |

(Continued)

FOREIGN PATENT DOCUMENTS

| | | | |
|---|---|---|---|
| CN | 114623903 A * | 6/2022 | ........... G01F 1/3209 |
| CN | 115077644 A * | 9/2022 | ............ G01F 15/02 |

*Primary Examiner* — Robert R Raevis
(74) *Attorney, Agent, or Firm* — The Webb Law Firm

(57) ABSTRACT

A type of meter register having a sealed register body, a member adapted to measure the flow of liquid through the meter, and a microprocessor adapted to send and receive messages from a cloud computing computer for determining a utility meter abnormality, comprising: receiving, at a utility meter, from a profile sharing server comprising one or more processors, a plurality of utility meter updates; generating, with the one or more processors, a utility meter profile based on the one or more utility meter updates; receiving, at the utility meter, from the profile sharing server, a utility meter profile; automatically determining, an abnormality of the utility meter by comparing the utility meter profile to the flow rate of fluid passed through the utility meter; and in response to determining an abnormality, sending an alert.

20 Claims, 5 Drawing Sheets

(56) References Cited

U.S. PATENT DOCUMENTS

| | | | | |
|---|---|---|---|---|
| 8,109,131 | B2 | 2/2012 | Winter | |
| 8,299,939 | B2 | 10/2012 | Gudlavenkatasiva et al. | |
| 8,537,028 | B2 | 9/2013 | Ehrke et al. | |
| 8,618,941 | B2 | 12/2013 | Javey et al. | |
| 9,135,770 | B2 | 9/2015 | Alberth, Jr. et al. | |
| 9,424,742 | B1 | 8/2016 | Solomon et al. | |
| 9,552,143 | B2 | 1/2017 | Javey et al. | |
| 9,912,492 | B2 | 3/2018 | McCarthy, III et al. | |
| 2012/0206274 | A1 | 8/2012 | LaFrance et al. | |
| 2012/0326884 | A1* | 12/2012 | Cornwall | F17D 3/01 340/870.02 |
| 2014/0317025 | A1 | 10/2014 | Monagas et al. | |
| 2018/0252611 | A1 | 9/2018 | Cole | |
| 2018/0259131 | A1 | 9/2018 | Ravid et al. | |
| 2020/0132565 | A1* | 4/2020 | Kent | G01F 15/003 |
| 2021/0079630 | A1 | 3/2021 | Poojary et al. | |

* cited by examiner

METHOD AND APPARATUS TO DETERMINE UTILITY USAGE

CROSS-REFERENCE TO RELATED APPLICATIONS

This application claims the benefit of U.S. Provisional Patent Application No. 63/378,898, filed Oct. 10, 2022, which is hereby incorporated by reference in its entirety.

BACKGROUND OF THE INVENTION

Field of the Invention

This invention relates to a utility meter system and method for detecting and resolving abnormalities of utility usage based on a meter profile for a consumer, transferring the meter profile into the utility meter, and controlling the utility meter based on a message or alert in response to a detected abnormality.

Discussion of Present Technology

In a home or building, utilities are used randomly by water consumers for various reasons at different times throughout the day and night. Water usage trends may vary significantly between users and any individual user may differ in their tendencies from that of an average user or differ even across entire classes of users. For example, a residential user may utilize more water during the night in contrast to the trend (i.e., residential users generally known to use less at night). For example, toilets, automatic sprinklers, showers, and/or the like may not be prevalent at night. Likewise, class to class may not match. For example, water usage of commercial consumers (e.g., commercial office buildings, business parks, industrial, farms, municipal stadiums, etc.) may all differ from expected trends for varying reasons.

Some abnormalities, such as external waterline leaks, may be easily detected through visual inspection and determination of ground water or puddles in the vicinity of a water pipe. However, other abnormalities, such as internal waterline leaks or broken devices (e.g., toilets, ice makers, washing machines, etc.) may not be detected as easily or at all. In some cases, issues may not be detected until an abnormal water bill is received or water damage is discovered. It may be even more difficult to detect abnormalities in commercial buildings where water usage and piping systems can be much larger than residential homes. For example, in a large commercial structure, water is used for toilets, industrial processes, heating and air-conditioning, fire sprinkler systems, and irrigation sprinkler systems. With such wide ranging usage, it may be difficult to pinpoint a leak or other abnormality.

Existing water meters used for residential and commercial properties may measure the total amount of water or gas flowing from the inlet to the outlet, but may not detect, predict, resolve, abnormal metering based on predictions from usage profiles. Thus, conventional meters may not provide timely information needed to detect abnormalities in usage.

SUMMARY OF THE INVENTION

Accordingly, it is an object of the presently disclosed subject matter to provide systems, methods, and computer program products to determine utility usage that overcome some or all of the deficiencies identified above.

According to non-limiting embodiments or aspects, provided is a cloud-implemented method of determining a utility meter abnormality, the method comprising receiving, from a utility meter, at a profile sharing server comprising one or more processors, a plurality of utility meter updates, generating a utility meter profile based on the one or more utility meter updates, receiving, at the utility meter, from the profile sharing server, the utility meter profile, automatically determining the utility meter abnormality by comparing the utility meter profile to a measured flow rate of fluid through the utility meter; and in response to determining the utility meter abnormality, sending an alert.

In some non-limiting embodiments or aspects, the computer-implemented method may further include the one or more utility meter updates comprises historical data contained by the utility meter including at least one of a volume of fluid passing through the utility meter and a time associated with a volume measurement.

In some non-limiting embodiments or aspects, the utility meter profile includes a time a measurement was made to determine the one or more utility meter updates.

In some non-limiting embodiments or aspects, the computer-implemented method may further include generating the utility meter profile by determining a subset of utility meter updates of the plurality of utility meter updates to identify a historical trend of a volume of fluid passing through the utility meter; and determining the utility meter profile identifying usage information associated with the subset of utility meter updates.

In some non-limiting embodiments or aspects, the historical trend is associated with at least one interval of a time, a date, a season, a holiday, or a time period and is based on a standard deviation of the plurality of utility meter updates during the associated interval.

In some non-limiting embodiments or aspects, the computer-implemented method may further include sending the alert by sending an alarm to a user of the utility meter, sending an alarm to a utility company, controlling a valve to stop passage of fluid, sending a message to the utility company, updating a log, or updating a utility meter profile.

In some non-limiting embodiments or aspects, the computer-implemented method may further include sending the alert by determining no amount of consumption; or determining an amount of consumption is outside of a range.

In some non-limiting embodiments or aspects, the consumption is outside of the range when the usage is outside of a standard deviation of a mean usage for the interval of the historical trend.

In some non-limiting embodiments or aspects, the computer-implemented method may further include sending, by the utility meter to the profile sharing server, the plurality of utility meter updates for determining a plurality of utility meter usage updates associated with a volume of fluid passing through the utility meter.

In some non-limiting embodiments or aspects, the utility meter profile includes one or more indicators of usage and one or more respective intervals for the one or more indicators, wherein the utility meter profile is loaded or stored into the utility meter, and further wherein executes programming instructions stored in the utility meter to detect the abnormalities in utility usage based on the utility meter profile.

In some non-limiting embodiments or aspects, the computer-implemented method may further include automatically generating an updated utility meter profile based on at least one utility meter update received after a previously generated utility meter profile.

Further non-limiting embodiments or aspects are set forth in the following numbered clauses:

Clause 1: A cloud-implemented method of determining a utility meter abnormality, the method comprising: receiving, from a utility meter, at a profile sharing server comprising one or more processors, a plurality of utility meter updates; generating, with the one or more processors, a utility meter profile based on the one or more utility meter updates; receiving, at the utility meter, from the profile sharing server, the utility meter profile; automatically determining the utility meter abnormality by comparing the utility meter profile to a measured flow rate of fluid through the utility meter; and in response to determining the utility meter abnormality, sending an alert.

Clause 2: The cloud-implemented method of clause 1, wherein the one or more utility meter updates comprises historical data contained by the utility meter including at least one of a volume of fluid passing through the utility meter and a time associated with a volume measurement.

Clause 3: The cloud-implemented method of clauses 1 or 2, wherein the utility meter profile includes a time a measurement was made to determine the one or more utility meter updates.

Clause 4: The cloud-implemented method of clauses 1-3, wherein generating the utility meter profile comprises: determining a subset of utility meter updates of the plurality of utility meter updates to identify a historical trend of a volume of fluid passing through the utility meter; and determining the utility meter profile identifying usage information associated with the subset of utility meter updates.

Clause 5: The cloud-implemented method of clauses 1-4, wherein the historical trend is associated with at least one interval of a time, a date, a season, a holiday, or a time period and is based on a standard deviation of the plurality of utility meter updates during the associated interval.

Clause 6: The cloud-implemented method of clauses 1-5, wherein sending the alert includes at least one of: sending an alarm to a user of the utility meter, sending an alarm to a utility company, controlling a valve to stop passage of fluid, sending a message to the utility company, updating a log, or updating a utility meter profile.

Clause 7: The cloud-implemented method of clauses 1-6, wherein sending the alert comprises: determining no amount of consumption; or determining an amount of consumption is outside of a range.

Clause 8: The cloud-implemented method of clauses 1-7, wherein the consumption is outside of the range if the usage is outside of a standard deviation of a mean usage for the interval of the historical trend.

Clause 9: The cloud-implemented method of clauses 1-8, further comprising: sending, by the utility meter to the profile sharing server, the plurality of utility meter updates for determining a plurality of utility meter usage updates associated with a volume of fluid passing through the utility meter.

Clause 10: The cloud-implemented method of clauses 1-9, wherein the utility meter profile includes one or more indicators of usage and one or more respective intervals for the one or more indicators, wherein the utility meter profile is loaded or stored into the utility meter, and further wherein executes programming instructions stored in the utility meter to detect the abnormalities in utility usage based on the utility meter profile.

Clause 11: The cloud-implemented method of clauses 1-10, comprising: automatically generating an updated utility meter profile based on at least one utility meter update received after a previously generated utility meter profile.

Clause 12: A utility meter comprising a register and a meter body, wherein the register is positioned on or in the meter body to measure a volume of fluid passing through the meter body, wherein the register comprises a register body, a clock, a memory, and a microprocessor disposed within the register body, the microprocessor further configured to: determine a flow rate of fluid passed through a meter body; send, from a utility meter to a profile sharing server comprising one or more processors, a plurality of utility meter updates, including a flow rate of fluid; receive, from the profile sharing server, a utility meter profile based on the one or more utility meter updates; store, at the utility meter, the utility meter profile for executing programming instructions to detect one or more abnormalities in utility usage; automatically determine the one or more abnormalities of the utility meter by comparing the utility meter profile to the flow rate of fluid passed through the utility meter; issue a signal to indicate the measured volume of fluid passed through the meter body is abnormal; and transmit the signal issued by the microprocessor.

Clause 13: The utility meter of clause 12, wherein the microprocessor determines whether the flow rate of fluid passed through the utility meter exceeded a range for a flow rate value of the utility meter profile associated with an interval of a historical trend.

Clause 14: The utility meter of clause 12 or 13, wherein the one or more utility meter updates comprises historical data contained by the utility meter including at least one of a volume of fluid passing through the utility meter and a time associated with the volume measurement.

Clause 15: The utility meter of clauses 12-14, wherein generating the utility meter profile comprises: determining a subset of utility meter updates of the plurality of utility meter updates that identify a historical trend of the volume of fluid passing through the utility meter; and determining the utility meter profile identifying usage information associated with the subset of utility meter updates.

Clause 16: The utility meter of clauses 12-15, wherein the historical trend is associated with at least one interval of a time, a date, a season, a holiday, or a time period and is based on a standard deviation of the plurality of utility meter updates during the associated interval.

Clause 17: The utility meter of clauses 12-16, wherein transmitting the signal includes at least one of: sending an alarm to a user of the utility meter, sending an alarm to a utility company, controlling a valve to stop passage of fluid, sending a message to the utility company, updating a log, or updating a utility meter profile.

Clause 18: The utility meter of clauses 12-17, wherein the microprocessor further configured to: determine no amount of consumption; or determine an amount of consumption is outside of a range.

Clause 19: The utility meter of clauses 12-18, wherein the consumption is outside of the range if the usage is outside of a standard deviation of a mean usage for the interval of the historical trend.

Clause 20: A non-transitory computer-readable medium having instructions stored thereon that, when executed by at least one computing device, cause the at least one computing device to: determine a flow rate of fluid passed through a meter body; send, from a utility meter to a profile sharing server comprising one or more processors, a plurality of utility meter updates, including a flow rate of fluid; receive, from the profile sharing server, a utility meter profile based on the one or more utility meter updates; store, at the utility meter, the utility meter profile for executing programming instructions to detect one or more abnormalities in utility usage; automatically determine the one or more abnormalities of the utility meter by comparing the utility meter profile to the flow rate of fluid passed through the utility meter; issue a signal to indicate a measured volume of fluid passed through the meter body is abnormal; and transmit the signal issued by a microprocessor.

DESCRIPTION OF THE INVENTION

Figure 1:
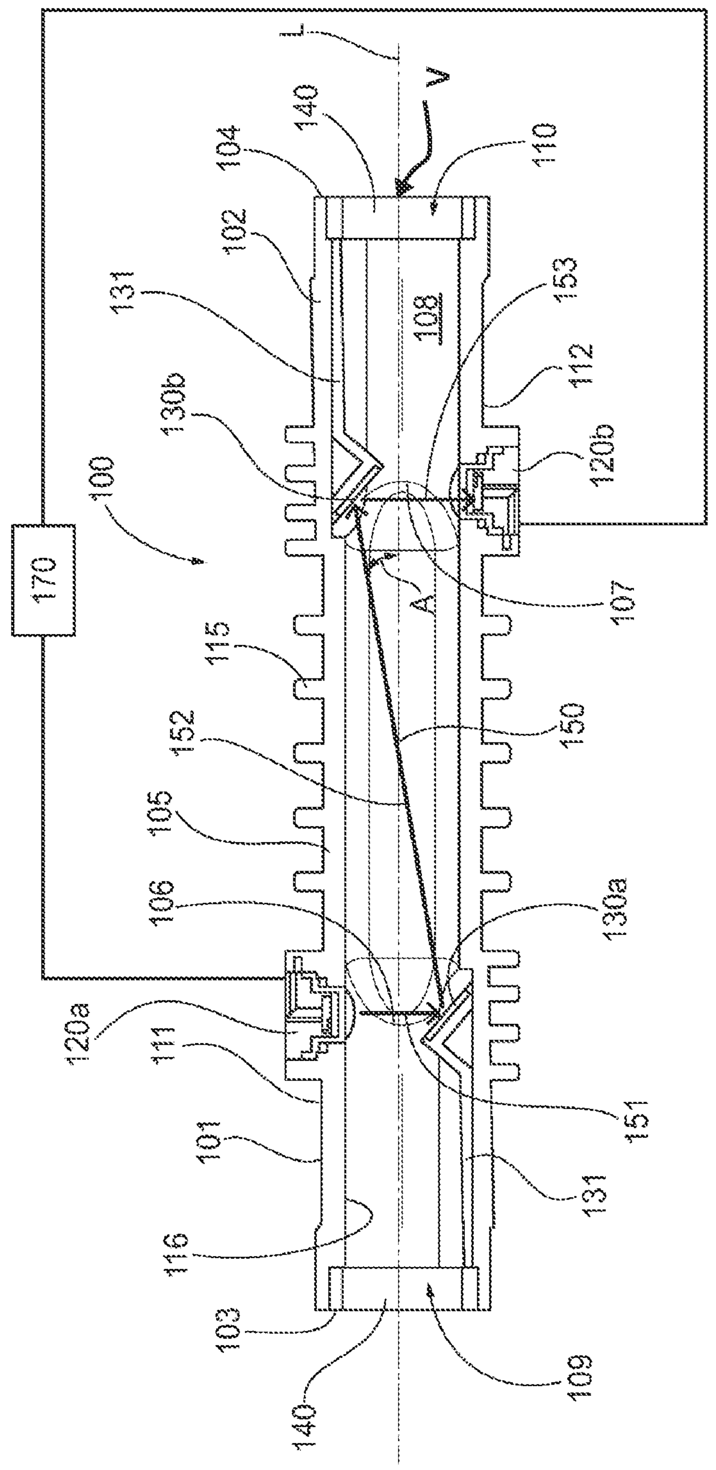
FIG. 1 is a diagram of a non-limiting embodiment or aspect in which systems, devices, products, apparatuses, and/or methods described herein can be implemented.

As used herein, spatial or directional terms, such as "inner," "outer," "left," "right," "up," "down," "horizontal," "vertical," and the like relate to the invention as it is shown in the drawing figures. However, it is to be understood that the invention can assume various alternative orientations and, accordingly, such terms are not to be considered as limiting. Further, all numbers expressing dimensions, physical characteristics, and so forth, used in the specification and claims are to be understood as being modified in all instances by the term "about". Accordingly, unless indicated to the contrary, the numerical values set forth in the following specification and claims can vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques. Moreover, all ranges disclosed herein are to be understood to encompass any and all subranges subsumed therein. For example, a stated range of "1 to 10" should be considered to include any and all subranges between (and inclusive of) the minimum value of 1 and the maximum value of 10; that is, all subranges beginning with a minimum value of 1 or more and ending with a maximum value of 10 or less, e.g., 1 to 6.7, or 3.2 to 8.1, or 5.5 to 10.

Before discussing non-limiting embodiments of the invention, it is understood that the invention is not limited in its application to the details of the particular non-limiting embodiments shown and discussed herein since the invention is capable of other embodiments. Further, the terminology used herein to discuss the invention is for the purpose of description and is not of limitation. Still further, unless indicated otherwise in the following discussion, like numbers refer to like elements.

It is to be understood that the present disclosure may assume various alternative variations and step sequences, except where expressly specified to the contrary. It is also to be understood that the specific devices and processes illustrated in the attached drawings, and described in the following specification, are simply exemplary and non-limiting embodiments or aspects. Hence, specific dimensions and other physical characteristics related to the embodiments or aspects disclosed herein are not to be considered as limiting.

No aspect, component, element, structure, act, step, function, instruction, and/or the like used herein should be construed as critical or essential unless explicitly described as such. Also, as used herein, the articles "a" and "an" are intended to include one or more items, and may be used interchangeably with "one or more" and "at least one." Furthermore, as used herein, the term "set" is intended to include one or more items (e.g., related items, unrelated items, a combination of related and unrelated items, etc.) and may be used interchangeably with "one or more" or "at least one." Where only one item is intended, the term "one" or similar language is used. Also, as used herein, the terms "has," "have," "having," or the like, are intended to be open-ended terms. Further, the phrase "based on" is intended to mean "based at least partially on" unless explicitly stated otherwise.

As used herein, the terms "communication" and "communicate" may refer to the reception, receipt, transmission, transfer, provision, and/or the like of information (e.g., data, signals, messages, instructions, commands, and/or the like). For one unit (e.g., a device, a system, a component of a device or system, combinations thereof, and/or the like) to be in communication with another unit means that the one unit is able to directly or indirectly receive information from and/or transmit information to the other unit. This may refer to a direct or indirect connection that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and communicates the processed information to the second unit. In some non-limiting embodiments or aspects, a message may refer to a network packet (e.g., a data packet and/or the like) that includes data. It may be appreciated that numerous other arrangements are possible.

As used herein, the term "water gateway" may refer to an entity and/or a processing system operated by or on behalf of such an entity (e.g., a water service provider, a water service facilitator, and/or the like), which provides water services (e.g., water service provider, water company, etc.) to one or more consumers or business consumers. The water services may be associated with the use of portable devices managed by a consumer or other service provider. As used herein, the term "water gateway system" may refer to one or more computer systems, computer devices, servers, groups of servers, and/or the like, operated by or on behalf of a water service provider.

As used herein, the term "computing device" may refer to one or more electronic devices configured to process data. A computing device may, in some examples, include the necessary components to receive, process, and output data, such as a processor, a display, a memory, an input device, a network interface, and/or the like. A computing device may be a mobile device. As an example, a mobile device may include a cellular phone (e.g., a smartphone or standard cellular phone), a portable computer, a wearable device (e.g., watches, glasses, lenses, clothing, and/or the like), a personal digital assistant (PDA), and/or other like devices. A computing device may also be a desktop computer or other form of non-mobile computer.

As used herein, the terms "client" and "client device" may refer to one or more computing devices that access a service made available by a server. In some non-limiting embodiments or aspects, a "client device" may refer to one or more devices that facilitate payment transactions, such as one or more POS devices used by a merchant. In some non-limiting embodiments or aspects, a client device may include a computing device configured to communicate with one or more networks and/or facilitate water service transactions such as, but not limited to, one or more desktop computers, one or more mobile devices, and/or other like devices.

As used herein, the term "server" may refer to or include one or more computing devices that are operated by or facilitate communication and processing for multiple parties in a network environment, such as the Internet, although it will be appreciated that communication may be facilitated over one or more public or private network environments and that various other arrangements are possible. Further, multiple computing devices (e.g., servers, cloud devices, mobile devices, and/or the like) directly or indirectly communicating in the network environment may constitute a "system." Reference to "a server" or "a processor," as used herein, may refer to a previously-recited server and/or processor that is recited as performing a previous step or function, a different server and/or processor, and/or a combination of servers and/or processors. For example, as used in the specification and the claims, a first server and/or a first processor that is recited as performing a first step or function may refer to the same or different server and/or a processor recited as performing a second step or function.

As used herein, the term "system" may refer to one or more computing devices or combinations of computing devices such as, but not limited to, processors, servers, client devices, software applications, and/or other like components. In addition, reference to "a server" or "a processor," as used herein, may refer to a previously-recited server and/or processor that is recited as performing a previous step or function, a different server and/or processor, and/or a combination of servers and/or processors. For example, as used in the specification and the claims, a first server and/or a first processor that is recited as performing a first step or function may refer to the same or different server and/or a processor recited as performing a second step or function. As used herein, a system may comprise a water metering system that involves data collection, storage, processing, and communication, the processor depends on factors, including the scale of the system, data processing requirements, and power efficiency. Such as a water metering systems with limited functionality data processing needs provided with low-power energy-efficient embedded microcontrollers (e.g., ARM Cortex-M series, etc.). In more advanced systems that require additional processing power and the ability to run a full operating system, single-board computers used, for data preprocessing, in local storage, and running communication protocols. For examples with more complex water metering systems via industrial PCs or ruggedized computers for tasks such as real-time data analysis, running databases, supporting advanced communication protocols. Remote and distributed metering systems operate in some examples, wireless communication, microcontrollers with integrated communication modules (e.g., Wi-Fi, LoRa, NB-IoT). These microcontrollers collect data and transmit wirelessly to remote water company computer. In scenarios where real-time data analysis or edge processing is necessary, edge computing devices equipped with GPUs or specialized accelerators can be employed and perform advanced analytics and decision-making in edge computers of the network, improving meter systems by reducing latency and bandwidth usage across a network. In cloud-connected water metering systems, much of the data processing may occur in the cloud, utilizing cloud computing services to process meter data into usable information (e.g., AWS, Azure, Google Cloud, etc.) focused mainly on data collection and communication.

As used herein, the term "supervised learning" may refer to one or more machine learning algorithms that start with known input variables (x) and an output variable (y), and learn the mapping function from the input to the output. The goal of supervised learning is to approximate the mapping function so that predictions can be made about new input variables (x) that can be used to predict the output variables (y) for that data. The process of a supervised algorithm learning from the training dataset can be thought of as a teacher supervising the learning process. The correct answers are known. The algorithm iteratively makes predictions on the training data and is corrected by the teacher. Learning stops when the algorithm achieves an acceptable level of performance. Supervised learning problems can be further grouped into regression problems and classification problems. Supervised learning techniques can use labeled (e.g., classified) training data with normal and outlier data, but are not as reliable because of the lack of labeled outlier data. For example, multivariate probability distribution based systems are likely to score the data points with lower probabilities as outliers. A regression problem is when the output variable is a real value, such as "dollars" or "exceptions". A classification problem is when the output variable is a category, such as "red" and "blue," or "compliant" and "non-compliant". For example, in a supervised learning context, domain knowledge can provide label instances of "normal" and "abnormal" water usage patterns based on historical data. For example, instances of high flow rates during non-peak times, prolonged continuous flow, or unusual fluctuations can be labeled as "abnormal", while typical usage patterns are labeled as "normal". Relevant features may then be extracted from the data, such as statistical measures, time-based features, and other relevant characteristics of water usage. Using the labeled dataset, a supervised learning model is trained, such as a decision tree, random forest, or a neural network, and/or the like. A water profile model adapts (e.g., learns, etc.) to recognize patterns associated with normal and abnormal water usage. In this way, the trained model may be operated in the utility meter system described herein to continuously monitor incoming data from one or more meters in real-time. When the profile model identifies a pattern that deviates significantly from the expected behavior profile (e.g., an abnormal water usage pattern), it triggers a notification or alert. When the profile model detects a prolonged period of continuous water flow during non-peak hours when there should be none (indicating a potential leak), it may generate an alert marked as "Urgent—Potential Leak Detected", and/or the like. When the model detects a sudden and abnormally high flow rate that exceeds the expected range during a typical usage period, it may generate a notification marked as "High Water Usage Alert", and/or the like.

As used herein, the term "unsupervised learning" may refer to an algorithm which has input variables (x) and no corresponding output variables. The goal for unsupervised learning is to model the underlying structure or distribution in the data in order to learn more about the data. Unlike supervised learning, in unsupervised learning there are no correct answers and there is no teacher. Unsupervised learning algorithms are used to discover and present the interesting structure in the data. Unsupervised learning problems can be further grouped into clustering and association problems. A clustering problem is modeling used to discover the inherent groupings in a dataset, such as grouping customers by purchasing behavior. An association rule learning problem is where you want to discover rules that describe large portions of data, such as suppliers that have a contract order exception also tend to have a voucher extended price that exceed a purchase order price. Some examples of unsupervised learning algorithms are clustering and likelihood modeling.

For example, historical data from various utility meters, including flow rate, time of day, temperature, pressure, and other relevant parameters is obtained. The system and method may standardize or normalize the historical data to ensure consistent scales and formats for all features. Unsupervised clustering algorithms such as K-Means, DBSCAN, or hierarchical clustering may be applied to the historical data to automatically group similar data points into clusters. From the characteristics of each cluster, the typical water usage patterns are detected within those clusters. Clusters with unusual patterns may indicate potential anomalies. Outliers may be detected by isolating aspects of the data (e.g., Isolation Forest or Local Outlier Factor (LOF), etc.) to identify data points that significantly deviate from the patterns observed in the clusters. These data points represent potential anomalies. Threshold values are set based on the level of deviation from the cluster profiles. Data points exceeding these thresholds are flagged as potential anomalies. When a data point is identified as a potential anomaly based on the thresholding, the system generates a notification or alert. For example, when the clustering analysis reveals that most data points fall into clusters with similar usage patterns (e.g., daily usage peaks during morning and evening), and a data point appears in a cluster with a completely different pattern (e.g., continuous flow at night), it is flagged as a potential anomaly and triggers an alert. In another example, when the outlier detection algorithm identifies a data point with flow rate measurements significantly different from the typical cluster profiles (e.g., extremely high or extremely low flow rate), it generates a notification marked as "Anomalous Water Usage Detected". In this way, unsupervised learning detects anomalies and unusual patterns in water usage data without prior labeling, making it suitable for scenarios where abnormal behaviors may not be well-defined in advance. It can be particularly useful for early anomaly detection and conservation efforts in water management.

As used herein, the term "training" may refer to a process of analyzing training data to generate a model (e.g., create a machine learning algorithm, a prediction model, a classification model, a segmentation model, etc.). For example, a training server uses machine learning techniques to analyze the training data to generate the model, often the training data includes numerous examples so that a robust model is generated to solve a problem for many variations present in the data. In some non-limiting embodiments or aspects, generating the model (e.g., based on training data from a variety of sources) is referred to as "training the model." The machine learning techniques include, for example, supervised and/or unsupervised techniques, such as decision trees (e.g., gradient boosted decision trees), logistic regressions, artificial neural networks (e.g., convolutional neural networks), Bayesian statistics, learning automata, Hidden Markov Modeling, linear classifiers, quadratic classifiers, association rule learning, and/or like. In some non-limiting embodiments or aspects, the model includes a prediction model that is specific to a particular geographic location, a particular match exception, a particular supplier, a particular vendor, and/or like.

As used herein, the term "machine learning inference engine" may refer to a process of executing a model algorithm and returns an inference output. For example, an inference engine (e.g., inference server, etc.) may utilize one or more processing units (e.g., a central processing unit (CPU), general processing unit (GPU), tensor processing unit (TPU), field programmable gateway array (FPGA), an application-specific integrated circuit (ASIC), etc.) to execute the model algorithm. In some non-limiting embodiments or aspects, a processing choice for machine learning inference can have a significant impact on speed, throughput, latency, accuracy, rate of learning, energy efficiency, and rate of learning.

In some examples, machine learning models, such as supervised or unsupervised models, are implemented as a real-time data streaming pipeline that continuously feeds data from utility meters to the machine learning inference engine. The machine learning inference engine continuously analyzes incoming data in real-time. The machine learning inference engine identifies deviations from the expected patterns, either through clustering or dedicated anomaly detection models. The machine learning inference engine may predict future water usage patterns based on historical data and real-time observations. When the inference engine detects an anomaly or unusual usage pattern that exceeds predefined thresholds or deviates significantly from predicted behavior, it may trigger an action, such as, for example, an alert or notification. In some examples, the inference engine may provide real-time alerts and notifications automatically for relevant stakeholders, such as utility providers, maintenance teams, or end-users, via email, SMS, or other communication channels based on the anomaly detected (e.g., the type of anomaly, the consumer associated with the anomaly, a predicted response to the anomaly, etc.). In some examples, an inference engine is continuously updated and improved via a feedback loop (e.g., learning new data and user feedback to enhance its accuracy in identifying anomalies and predicting water usage patterns, etc.). The inference engine may handle a large number of utility meters and data streams simultaneously, making it suitable for utility providers serving diverse customer bases.

As used herein, satisfying a threshold may refer to a value (e.g., a score, a power consumption, etc.) being greater than the threshold, more than the threshold, higher than the threshold, greater than or equal to the threshold, less than the threshold, fewer than the threshold, lower than the threshold, less than or equal to the threshold, equal to the threshold, and/or the like.

As used herein, an alert is an urgent and immediate message or signal designed to grab someone's attention quickly. An alert may be associated with critical or time-sensitive events or emergencies, to inform the recipient about something that requires their immediate action or awareness. Alerts may be more intrusive and can include loud sounds, pop-up windows, or other attention-grabbing mechanisms.

As used herein, a notification is a broader term that encompasses various types of messages or updates that inform individuals about events or information. Notifications can be informative rather than urgent. They provide information or updates that do not necessarily require immediate action. Notifications are often presented in a less disruptive manner, such as a message on a device's screen, an email, a text message. Notifications include social media notifications, email notifications, or app updates.

As discussed above, water loss is a significant and prevalent problem in many parts of the world. It is often referred to as "non-revenue water" or "unaccounted-for water". Water loss occurs when treated and potable water is lost or unaccounted for before it reaches the end-users. A number of factors may contribute to water loss problems.

Problems with aging and deteriorating water infrastructure cause continuous abnormalities (e.g., issues, problems, trends, etc.) in water delivery. Issues are wide ranging, including broken or inoperable pipes, valves, reservoirs, and/or the like, which develop leaks or other problems over time from wear and tear. For example, undetected leaks may result in significant loss of treated water before it reaches consumers. Water theft or illegal connections to water supplies also leads to unaccounted-for water loss. Inaccurate metering caused by faulty or outdated water meters may not accurately measure water consumption. In addition, non-trivial steps to retrace the problem may cause lost time, wages, resources, production, and/or the like. Problems may lead to many discrepancies, examples include those for water supplied, recorded usage, unaccounted for water supply, etc.

Data handling errors (e.g., errors in data recording, errors in billing, etc.) can result in water loss. For example, inaccurate records of water consumption may cause problems and limit the effectiveness of water management. Losses that occur within the water distribution system may result from water main breaks, water pressure issues, flushing of water pipelines, and/or the like.

The economic impact from water loss is also a problem and represents a combined financial loss for both water utilities and water consumers. This means that a significant portion of the treated and distributed water is not generating revenue, potentially leading to higher costs for consumers. In regions with water scarcity, every drop of water is valuable. Losing treated water exacerbates water scarcity issues. Moreover, aging infrastructure with high rates of leakage requires costly maintenance and repair. Addressing water loss is essential for ensuring the long-term sustainability of water distribution systems. Treating and pumping water consumes energy. The energy used in treatment and distribution also goes to waste, contributing to higher energy consumption and associated environmental impacts.

To address water loss, improved water meters, water meter systems, and water meter leak detection methods, and computer program products are provided to address problems related to water consumption monitoring and analysis, specifically focused on addressing anomalies and improving water management.

In some non-limiting embodiments or aspects, the improved systems and methods described herein may provide more accurate or sufficient detection of anomalies in water consumption patterns. For example, the improved systems and methods herein may more sufficiently or accurately identify situations where there is an unexpected or unusually high water flow when it is not expected. Such situations could indicate a leak or other issue. Improvements in detecting anomalies in water consumption patterns are disclosed herein, such as detecting or predicting unexpected high water flow, essential for identifying potential leaks or issues. By identifying (e.g., catching, etc.) these anomalies early, water management systems are improved, the system becomes more efficient as water losses due to leaks or inefficiencies are minimized and decreased.

In addition, improved systems and methods herein aim to predict consumer behaviors concerning water usage. This prediction involves creating consumption profiles, such as, for each consumer or water meter. This prediction may be information to provide the system a factor to infer understanding of a usage based on typical usage patterns. For example, the information may be used in a water meter system to detect or predict when water usage is a result of people taking showers, irrigating farms, filling the swimming pool, and/or the like.

In addition, improved systems and methods herein aim to optimize water distribution and resource allocation. By understanding when consumers are likely to use water (e.g., showers, irrigation), water suppliers can better plan and manage water resources to meet demand effectively. The improved systems and methods described herein also enhance water management by sending alerts to both consumers and water companies when unusual consumption patterns or anomalies are detected. The improved systems and methods herein also provide preventive actions to handle issues promptly. Sending alerts, warnings, notices, information, and/or the like to both consumers and water companies when anomalies are detected. Thus, improvements to water management may be accomplished in multiple ways.

In addition, improved systems and methods herein aim to proactively respond to water issues, thereby reducing water wastage and infrastructure damage. Consumers may also take preventive measures to optimize water usage, to improve water conservation along with other resources. This empowers consumers to monitor and manage their water usage effectively. This not only promotes water conservation at the individual level but also helps water companies by reducing peak demands and making consumers more aware of their consumption.

In this way, the improved systems and methods disclosed herein may be integrated with consumers and customers facing water delivery solutions, such as a water advisory or other integrated systems which provide capabilities to consumers and water districts to monitor their water usage and set thresholds. The improved systems and methods disclosed herein may be integrated with consumers and customers facing water delivery solutions thereby ensuring improved seamless integration. Other improvements include remote control of water meter by generating data and alerts in the improved systems described herein. Remote control of water meters based on data and alerts further enhances water management. Remote control of water meters by water companies improves response to detected issues, reduces time to immediate action to prevent water wastage, improvise response to water meters to take action due to leaks or other abnormal consumption patterns.

With reference to FIG. 1, meter device 100 is shown in accordance with some non-limiting embodiments or aspects. Meter device 100 may be utilized in some non-limiting embodiments or aspects, including for determining a flow rate and/or volume of a liquid, such as water, passing through meter device 100 in a piping system.

A shown in FIG. 1, meter device 100 includes piping arrangement 101 having tubular body 102 extending along longitudinal axis L from first end 103 to second end 104. Tubular body 102 includes measurement section 105 disposed within tubular body 102 intermediate of first end 103 and second end 104. Tubular body 102 defines fluid passage 108 extending along longitudinal axis L through tubular body 102 from first end 103 to second end 104. Meter device 100 also includes two ultrasonic transducers 120*a*, 120*b*, which are spaced apart along longitudinal axis L, disposed on opposing sides 111, 112 of tubular body 102. Meter device 100 further includes two reflective elements 130*a*, 130*b*, which are spaced apart along longitudinal axis L, disposed on opposing sides 111, 112 of tubular body 102. Piping arrangement 101 may also include bracket 162 extending from the upper side of tubular body 102. Bracket 162 is configured to support an ancillary device, such as register 170 or an antenna, on piping arrangement 101.

As shown in FIG. 1, in some non-limiting embodiments or aspects, plurality of fins 115 extend from and around the outer circumferential surface of tubular body 102. Fins 115 may extend around the entire outer circumferential surface of tubular body 102. Fins 115 may also only extend around a portion of the outer circumferential surface of tubular body 102. In one aspect, fins 115 may be defined as protruding members extending from the outer surface of tubular body 102. Fins 115 are configured to minimize the expansion of tubular body 102 due to any increases in temperature or pressure in fluid passage 108 through tubular body 102. Fins 115 are also configured to maintain the inner diameter of interior surface 116 of tubular body 102.

The amount of time it takes for the ultrasonic sound wave to move through the liquid that flows through meter device 100 may be determined using ultrasonic transducers 120*a*, 120*b*. Ultrasonic transducers 120*a*, 120*b* may measure the average time it takes for the ultrasonic sound wave to move through measurement section 105 of tubular body 102. The velocity of the liquid flowing through meter device 100 may be determined by dividing the measured distance of travel path 150 of the ultrasonic sound wave by the measured transit time between the pulses of ultrasonic sound waves propagating into and against the direction of liquid flow. Using the calculated velocity, the flow rate of the liquid through measurement section 105 may be determined.

In some non-limiting embodiments or aspects, register 170 is operatively connected to ultrasonic transducers 120*a*, 120*b*. For example, as shown in FIG. 1, register 170 may operate ultrasonic transducers 120*a*, 120*b* to emit and receive an ultrasonic sound wave. Register 170 may incorporate a microprocessor as further explained hereinafter, configured to transmit commands to ultrasonic transducers 120*a*, 120*b* to emit and receive an ultrasonic wave. The controller microprocessor within register 170 may also receive signals from ultrasonic transducers 120*a*, 120*b* indicating that an ultrasonic sound wave has been transmitted and received. The microprocessor within register 170 may also be programmed to measure the speed of the ultrasonic sound wave through measurement section 105 and also for calculating the flow rate of the liquid flowing through piping arrangement 101 based on the measured speed of the ultrasonic sound wave. Register 170 may also incorporate a power source, such as a battery or a panel, for powering the controller and for powering ultrasonic transducers 120*a*, 120*b*. Additionally, or alternatively, ultrasonic register 170 may be in communication with a remote register via a transmitter mounted on tubular body 102. The transmitter may be an antenna or other device that transmits information to the receiver (e.g., over the air, via a public network, via a private network, etc.). For example, the antenna may be a planar inverted-F antenna ("PIFA"). In some examples, the transmissions are made via a low power radio signal, via BLUETOOTH®, via low power communications protocol, via a Wi-Fi connection, via a proprietary or public water company network, and/or the like. Alternatively, ultrasonic transducers 120*a*, 120*b* may be in communication with the remote register via a capacitive link. In the case that the register is provided remotely, the power source may be incorporated directly in or on tubular body 102.

As shown in FIG. 1, fluid passage 108 includes inlet 109 defined at first end 103 of tubular body 102 and outlet 110 defined at second end 104 of tubular body 102. In some non-limiting embodiments or aspects, fluid passage 108 has a first width W1 at inlet 109 and outlet 110, and a second width W2 in measurement section 105 of tubular body 102. The first width W1 of fluid passage 108 at inlet 109 and outlet 110 is larger than the second width W2 of fluid passage 108 through measurement section 105. In particular, as shown in FIG. 1, fluid passage 108 has a circular cross-sectional shape at inlet 109 and outlet 110, and an oval or oblong circular shape in measurement section 105. Interior surface 116 of tubular body 102 is sloped at first end 103 and second end 104 of measurement section 105 where fluid passage 108 transitions between the circular and oblong circular shapes.

A cross-sectional area of fluid passage 108 is the same throughout the entire length of tubular body 102 along longitudinal axis L, including at inlet 109 and outlet 110 and through measurement section 105. The reduction in width of fluid passage 108 in measurement section 105 allows for a more uniform flow of liquid through measurement section 105 and alleviates swirling and eddying of the flow through the measurement section, which may disrupt transmission of the ultrasonic sound wave. The cross-sectional area of fluid passage 108 is maintained along its entire longitudinal length, including through measurement section 105, in order to avoid changing the flow rate of the liquid (speeding up and slowing down) as the liquid enters and leaves measurement section 105.

In particular, measurement section 105 is configured to create an elliptical flow of liquid through tubular body 102 in measurement section 105. The elliptical liquid flow may move from the top of tubular body 102 to the bottom of tubular body 102, instead of side to side in tubular body 102. The cross section of fluid passage 108 through measurement section 105 broadens laterally between opposing sides 111, 112 of tubular body 102. The elliptical water flow provides a more accurate measurement of the time it takes for the ultrasonic sound wave to travel through measurement section 105 because a substantial amount of the water flow is moving along travel path 150 of the ultrasonic sound wave. During operation of meter device 100, the liquid flow may become turbulent moving through tubular body 102. Due to this turbulence in the water, air bubbles may be created, which float to the top of tubular body 102. By using an elliptical water flow, however, any bubbles created by turbulent flow of the water may be directed to the top of tubular body 102, instead of opposing sides 111, 112 of tubular body 102 that hold reflective elements 130*a*, 130*b* and ultrasonic transducers 120*a*, 120*b*.

In some non-limiting embodiments or aspects, travel path 150 of the ultrasonic sound wave through measurement section 105 includes first segment 151 extending laterally across measurement section 105 from first ultrasonic transducer 120*a* to first reflective element 130*a*, second segment 152 extending laterally and longitudinally at angle A with respect to longitudinal axis L from first reflective element 130*a* to second reflective element 130*b*, which is disposed on opposite end 107 of measurement section 105 and on opposing side 111 of tubular body 102 from first reflective element 130*a*, and third segment 153 extending laterally across measurement section 105 from second reflective element 130*b* to second ultrasonic transducer 120*b*. According to the embodiment shown, angle A of second segment 152 of travel path 150 with respect to longitudinal axis L is approximately 9°. Moreover, U.S. Pat. No. 9,714,855 is incorporated herein by reference for all that it contains. Furthermore, examples utilizing a measuring cup can be found in U.S. Pat. No. 10,704,946, incorporated herein by reference for all that it contains.

Figure 2:
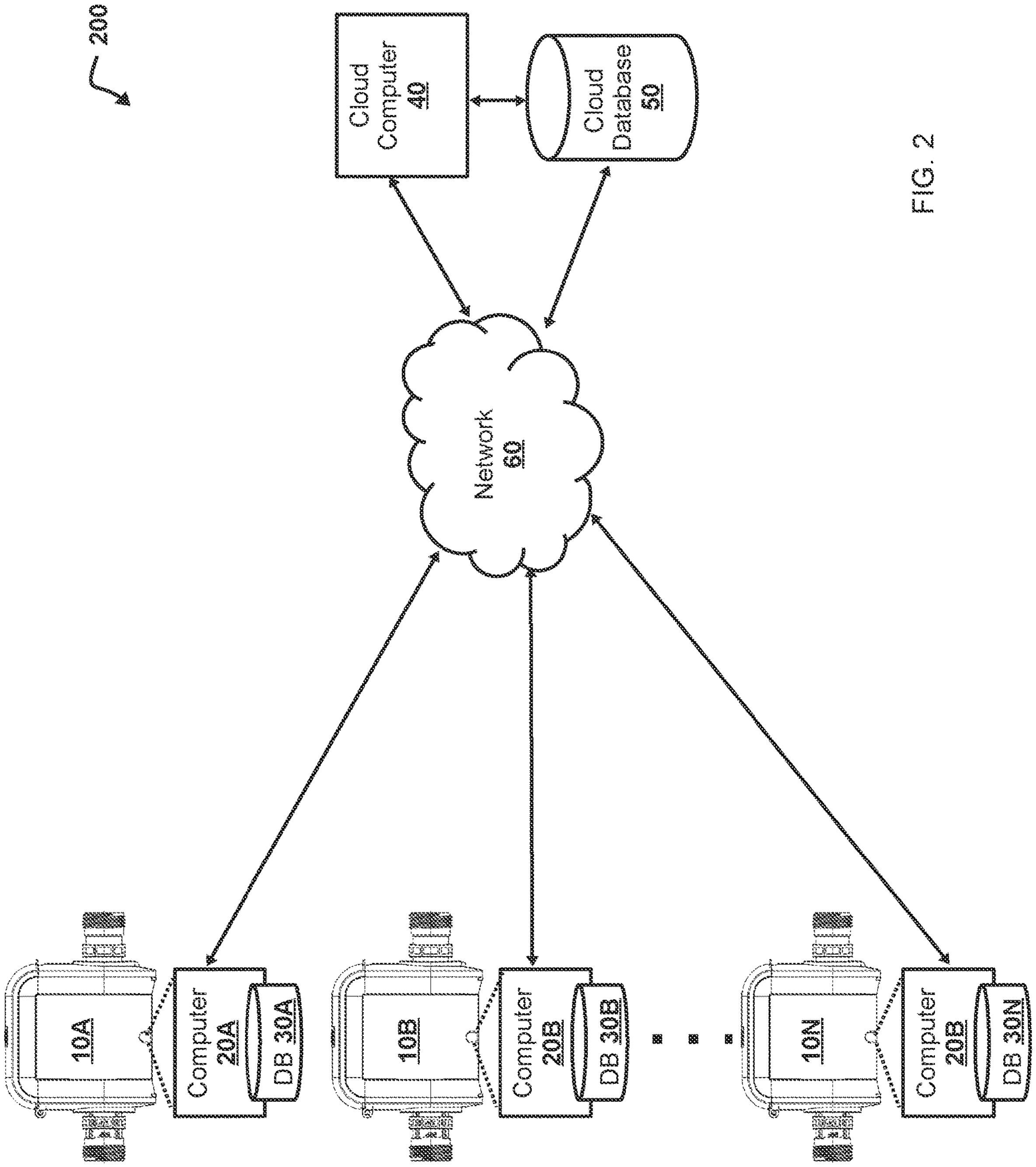
FIG. 2 is a diagram of a non-limiting embodiment or aspect in which systems, devices, products, apparatuses, and/or methods described herein can be implemented.

FIG. 2 illustrates a diagram of non-limiting embodiments or aspects of utility meter control system 200 in which systems and/or methods, described herein, may be implemented. In some non-limiting embodiments or aspects of meter control system 200, utility meters 10A-10N (e.g., or utility meter 10 when discussing capabilities of utility meters 10A-10N generally, etc.). Utility meter 10 may include computer 20 and database 30 (e.g., as shown, utility meter 10A comprising computer 20A and DB 30A, utility meter 10B comprising computer 20B and DB 30B, and utility meter 10N comprising computer 20N and DB 30N, e.g., register 170 as shown in FIG. 1 that incorporates a microprocessor, etc.).

In some non-limiting embodiments or aspects, utility meter 10 may send a message via computer 20 and DB 30 (e.g., utility meter 10A may send a message via computer 20A and DB 30A, utility meter 10B may send a message via computer 20B and DB 30B, etc.), and utility meter 10N may send a message via computer 20N and DB 30N, and so on. For example, at least one utility meter 10A-N (e.g., one or more computers 20A-20N transmit messages, etc.) may send a message to cloud computer 40 (e.g., a central hub or data center, such as a remote computer, a remote server, a remote cloud system, a plurality of connected remote computers, etc.). As an example, utility meter 10A-N sends an alarm to cloud computer 40 via a communication network 60 (e.g., a low power radio signal, BLUETOOTH®, network operating low power communications protocols, via a Wi-Fi connection, etc.).

In some non-limiting embodiments or aspects, at least one utility meter 10 may send a message to cloud computer 40 when water usage is outside certain parameters. In some non-limiting embodiments or aspects, at least one utility meter 10A-N sends a message to cloud computer 40 to activate (e.g., stop water usage at specified times, stop water, etc.) usage at specified times. For example, at least one utility meter 10A-N activates the usage when certain parameters are outside (e.g., not equal, etc.) set forth in the table. The message may include an alarm, notification, and can provide a utility with information about utility meter 10 that is used for supplying electricity, gas, water, or sewage to an end user.

It will be appreciated that the at least one utility meter 10A-N may also receive signals (e.g., in register 170, etc.). The at least one utility meter 10A-N may determine a signal (e.g. a single signal, multiple signals, etc.) associated or defining the usage at water meter 10 does not match (e.g., is outside, not equal to, etc.) the consumer profile stored in utility meter 10A-N (e.g., a field in database 30A of computer 20A, etc.).

In some non-limiting embodiments or aspects, register 170 is equipped with electronic components and data communication capabilities, databases 30A-N may store flow data, profile data, flow targets, information obtained from external communications like document-oriented databases (e.g., MongoDB), key-value stores (e.g., Redis), or time-series databases (e.g., InfluxDB) suited for flexibility in schema and allowing diverse data structures to coexist for improved handling data generated by water meters that may not conform to a strict schema (e.g., highly scalable, increasing volume of data generated by water meters over time, etc.). The database is configured to handle the growing data ingestion rates associated with water meter readings. Additionally, databases 30A-N and remote database 50 manage time-series data (e.g., NoSQL, Indexed, etc.) more efficiently, store and retrieve data points, and determine activations based on timestamps obtained from a consumer profile. For scenarios where data is collected from multiple meters 10A-N, distributed across a geographic area, a distributed structure as described herein ensures data consistency and availability for metadata stores, improving timeliness of information related to flow data, profile updates, and flow targets for determining flow data predictions in real-time.

It will be appreciated that, in some non-limiting embodiments or aspects, databases 30A-30N are configured to seamlessly integrate with external systems and APIs, allowing for the reception, processing, and storage of data obtained from external communications. This capability is essential for central monitoring systems to send (or receive) alerts, commands, notifications, or updates to the water meters, and to access or control the meter data stored within the meter database (e.g., 30A, etc.) or remote database 50. The databases may be configured to seamlessly integrate with external systems and APIs allowing for the automated monitoring, predicting, and messaging (e.g., communicating alerts, warnings, metrics deemed important, etc.) via effective water management, analytics, and external system integration to display anomalies in flow targets when comparing flow data in real-time.

In some non-limiting embodiments or aspects, cloud computer 40 integrates the meter processing information received from utility meters 10A-N with meter processing information stored in the cloud to provide real-time information. In some examples, cloud computer 40 integrates meter processing information into a warning system, custom warnings generator, and alerts system.

Meter control system 200 includes utility meters 10A-10N. Utility meters 10A-10N may include computer 20 and database 10 (e.g., utility meter 10A comprising computer 20A and DB 30A, utility meter 10B comprising computer 20B and DB 30B, and/or the like) and register 170, as shown in FIG. 1, executes instructions via a control microprocessor (e.g., computers 20A-N, etc.).

In some non-limiting embodiments or aspects, utility meter 10A may send a message via computer 20A and DB 30A, utility meter 10B may send a message via computer 20B and DB 30B, and utility meter 10N may send a message via computer 20N and DB 30N, such that each utility meter 10A-N sends messages periodically to update cloud computer 40, and/or the like. For example, at least one utility meter 10A-N (e.g., one or more computers 20A-20N transmit messages, etc.) may send a message to cloud computer 40 (e.g., a central hub or data center, such as a cloud computer, a remote server, a remote cloud system, a plurality of connected remote computers, etc.). As an example, utility meter 10A-N calculates and stores processing information that it can then send periodically to cloud computer 40 via communication network 60 (e.g., a low power radio signal, BLUETOOTH®, network operating low power communications protocols, via a Wi-Fi connection, etc.).

In some non-limiting embodiments or aspects, an electronics package may additionally include one or more processors, storage, circuitry, and/or the like as shown in FIG. 2, which is electrically coupled to one or more power source (e.g., batteries, etc.). Register 170 includes an antenna electronically coupled to computer 20. Initially, water passes through inlet 16 to outlet 18. Computer 20 can determine the flow rate, volume, and direction. In this manner, a signal can be provided to network 60, or alternatively to the antenna and then to network 60, indicating the volumetric amount of fluid passing through the meter.

In some non-limiting embodiments or aspects, meter control system 200 and methods described herein may be implemented on, or in connection with, computer 20 of at least one utility meter 10, provides a clock, storage memory, a communication device, a display interface, and database 30 disposed within the register body, wherein an antenna is coupled to a processor of computer 20. For example, computer 20 of meter 10 may obtain a measured volume of fluid passing through the meter body. In some non-limiting embodiments or aspects, computer 20 determines a flow rate of fluid passed through a meter body, and sends, from a utility meter, to cloud computer 40 (e.g., profile sharing server, cloud computer, etc.) comprising one or more processors, a plurality of utility meter updates, including a flow rate of fluid. In such an example, cloud computer 40 may generate a profile based on a model (e.g., a meter profile, etc.).

In such an example, after generating the model, cloud computer 40 sends the profile to utility meter 10. In such an example, computer 20 of meter 10 receives and stores the profile at utility meter 10, and the utility meter profile can be based on the one or more utility meter updates sent to cloud computer 40 from one or more utility meters 20.

In some non-limiting embodiments or aspects, computer 20 executes programming instructions stored in utility meter 10 to detect abnormalities in utility usage based on the profile. The programming instructions may include automatically determining an abnormality of the utility meter by comparing the utility meter usage profile to a measured flow of water through the utility meter. Computer 20 issues a signal to indicate that the measured volume of fluid passed through the meter body is abnormal. For example, network 60 (or antenna) transmits signals corresponding to the signal issued by the microprocessor.

In some non-limiting embodiments or aspects, periodic updates are generated (e.g., once a day, a week, a month, a quarter, etc.) to information used to create a profile table. For example, computer 20 of utility meter 10 may store utility meter data (e.g., utility meter updates, etc.) for a period of time before transmitting to cloud computer 40. In such an example, in response to receiving a utility meter update, cloud computer 40 may generate a utility meter profile. In another example, cloud computer 40 may receive and store regular updates from computer 20 (e.g., utility meter updates sent as they occur, etc.) that would be included in utility meter profiles downloaded onto the meter from the cloud. For example, the utility meter profile may determine a usage between 7:00 PM-8:00 PM, generally 20 gallons (e.g., liters, cubic feet, etc.) of water are used and/or between 8:00 PM-9:00 PM, typically 10 gallons are used and/or the like. The utility meter profile (e.g., profile table, usage profile, profile database, etc.) may be updated periodically, for example, once a month as usage changes. In such an example, during the summer months, more water may be used than in the winter months, more water may be used when a weekday falls on a holiday, and/or the like.

In some non-limiting embodiments or aspects, computer 20 or cloud computer 40 may send an alarm to cloud computer 40 if water usage at specified times is outside certain parameters set forth in the table. In some non-limiting embodiments or aspects, a shutoff valve could be activated if water usage at specified times is outside certain parameters set forth in the table. The alarm can provide a utility with information about utility meter 10 that is used for supplying electricity, gas, water, or sewage to an end user.

In some non-limiting embodiments or aspects, computer 20 determines anomalies in meter 10 in addition to providing a signal (e.g., to network 60, to antenna 74, and/or the like, to send to the cloud computer) indicating the volumetric amount of fluid passing through meter 10. For example, meter 10 may also receive a signal that includes information transmitted from cloud computer 40 (e.g., a central computer, remote computer, etc.). For example, computer 20 receives a utility meter profile (e.g., usage patterns, trends, etc. related to meter 10) that may be used to determine if the water meter has any abnormalities, such as abnormalities associated with usage. Based on the calculated flow rate, an abnormal water meter flow is determined. Computer 20 of the water meter is programmed to periodically compare an expected range of the utility meter profile (e.g., an expected range of meter 10, etc.) with the actual flow rate, i.e., the meter flow rate. As stated above, other types of meter registers and meters can be used such as solid state meter registers and ultra-sonic meter registers, wherein the meters and meter register are configured for wireless communication and a computer/microprocessor in part of the register and/or meter.

In some non-limiting embodiments or aspects, the water flow through the water meter is monitored by computer 20 in association with a meter profile based on historical utility meter data sent from utility meter 10 to cloud computer 40. As an example, the water flow through utility meter 10A is monitored by computer 20A in association with a meter profile. The water meter profile is previously generated by cloud computer 40 based on historical utility meter data sent from utility meter 10A.

When the measured water flow rate is abnormal (e.g., outside a range for a normal reading, outside an observed range, etc.), for example, computer 20A detects that meter 10 has abnormal conditions by comparing the observed reading with the meter profile. For example, computer 20A sends an alert (e.g., an alert signal, etc.) that meter 10 has abnormal conditions. With this arrangement, no alert transmitted from utility meter 10 is a confirmation that the installed meter is in a normal state. As will be appreciated, computer 20 can be programmed or configured to send a continuous signal as long as the water flow rate through meter 10 is within the normal range and discontinue the signal when the measured water flow rate is outside the flow rate range. Alternatively, meter 10 may be programmed or configured to send a signal only when the measured water flow rate is outside the flow rate range.

In some non-limiting embodiments or aspects, when the measured water flow rate is greater than the maximum flow and certain other criteria programmed in computer 10, computer 10 transmits a signal, e.g. an alarm signal to utility cloud computer 40 that the flow of the installed meter 10 is not normal. In such an example, other criteria could be the number of times that the flow rate exceeded the maximum flow rate. Also, other criteria could be the length of time that the flow rate exceeded the maximum flow rate. Other criteria could be the time intervals between when the flow rate exceeded the maximum flow rate. Still other examples, may include: 1. flow exceeding the maximum flow rate ten times; 2. flow exceeding the maximum flow rate by a total amount of 1 hour; 3. flow exceeding the maximum flow rate by ten times over the period of six months; 4. flow through the meter exceeds recommended flow volume for a period of time, for example: 10,000 gallons over a three month period, and/or the like. Computer 10 can be programmed to monitor one or more of the above conditions and send an alarm to a utility if one or more of the conditions occur to indicate an anomaly or other problems in the meter.

As can be appreciated, the invention is not limited to the program of computer 20 and other programs or configurations indicating that the water meter is exhibiting abnormal behavior based on current water flow rate and can be used in the practice of the invention. Further, as can be appreciated, the invention is not limited to the embodiments of the invention discussed herein, and the scope of the invention is only limited by the scope of the claims.

Figure 3:
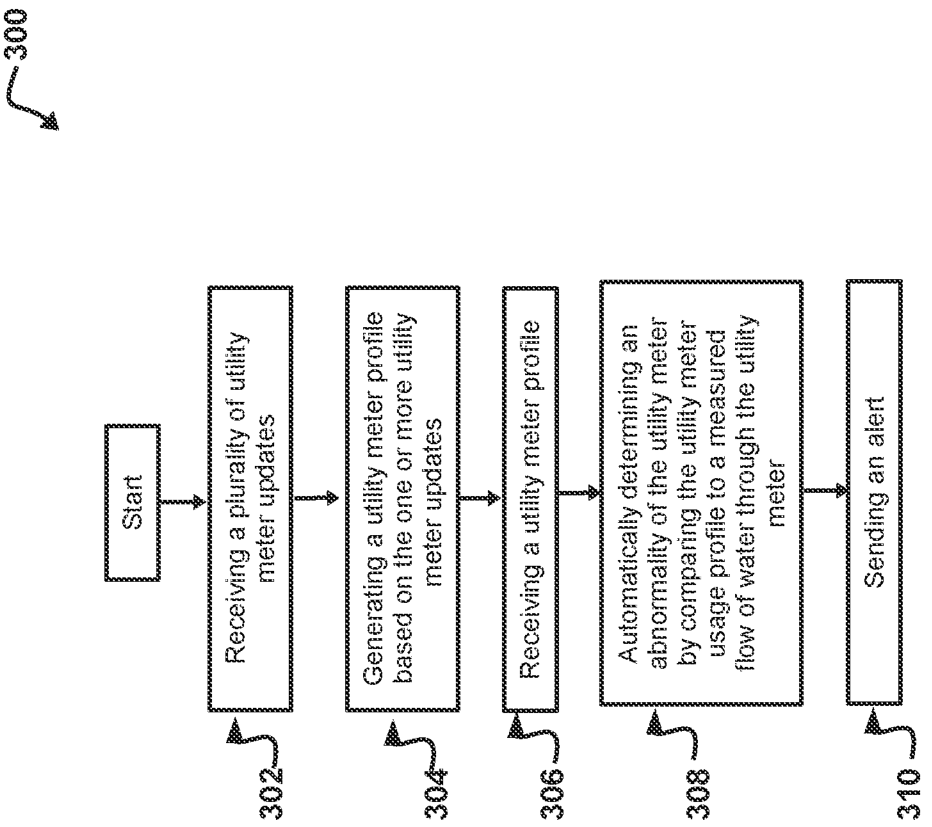
FIG. 3 is a flowchart of a non-limiting embodiment or aspect of a process for detecting abnormalities of utility.

FIG. 3 is a flowchart of a non-limiting embodiment or aspect of process 300 for identifying an abnormality in a utility meter. In some non-limiting embodiments or aspects, one or more of the steps of process 300 are performed (e.g., completely, partially, etc.) by utility meter 10 (e.g., one or more processors of computer 20, etc.), by cloud computer 40 (e.g., one or more processors of cloud computer 40), by database 102*a*, by cloud database 106*a*, and/or the like.

Referring to FIG. 3, at step 302, process 300 includes receiving utility meter updates. For example, in some non-limiting embodiments or aspects, cloud computer 40 receives or obtains one or more periodic updates for one or more utility meter parameters. For example, each of computers 20A-N may monitor their respective utility meters 10A-N continuously. In such an example, computers 20A-N accurately measure, process, and analyze parameters in meters 10A-N.

For example, computers 20A-N may continuously monitor the flow rate of water and other variables as water passes through respective utility meter 10A-N. In some examples, computers 20A-N may then store (e.g., in database 30A-N, etc.) and/or transmit updates to cloud computer 40 associated with current or predicted states of meter 10.

In some non-limiting embodiments or aspects, computer 20 (e.g., one of computers 20A-20N, etc.) transmits utility meter updates (e.g., flow information for utility meter 10A-N to cloud computer 40, etc.). For example, computer 20 (e.g., computers 20A-N, etc.) transmits utility meter updates to remote computer 40 (e.g., cloud computer, etc.) that includes flow information. In such an example, utility meter 10 (e.g., utility meters 10A-N, etc.) continuously measures the flow rate of water and periodically sends updates to the cloud computer to update (e.g., memorialize, etc.) a reading over a particular time period. These updates include information about the volume of water consumed, which can be used for billing and usage analysis. Some utility meters also record temperature data to monitor variations in water temperature over time, water pressure within the system, to monitor changes in water pressure. In some examples, if the utility meter is battery-powered, it may send updates regarding its battery status to ensure that the meter's power source is adequate.

In some non-limiting embodiments or aspects, computers 20 transmit periodic updates (e.g., hourly, daily, weekly, etc.) from utility meter 10A. For example, utility meter 10A transmits periodic updates to cloud computer 40 associated with the status of utility meter 10A-N. Cloud computer 40 stores, processes, and transmits the updates. In such an example, the periodic updates are calculated and recorded over a specific time period that corresponds to the measurement of fluid volume. For instance, if the utility meter is measuring water consumption, these updates might be generated on an hourly or daily basis to track water usage patterns.

In some non-limiting embodiments or aspects, cloud computer 40 receives or obtains at least one utility meter reading (e.g., utility meter updates, etc.). For example, cloud computer 40 receives periodic updates transmitted from computer 20A, at least one utility meter reading transmitted from computer 20B, and/or at least one utility meter reading transmitted from computer 20N. In an example, computer 20A transmits utility meter updates (e.g., flow information for utility meter 10A to cloud computer 40, etc.). In some examples, the updates may be sent to a transfer platform, where the updates can be stored until obtained by a cloud computer. In other examples, cloud computer 40 may obtain the updates directly from an accessible storage of utility meters 10A-N. In this way, utility meter updates may be based on at least a volume measurement of fluid passing through utility meter 10 for any needed period of time to determine an anomaly.

As an example, Table 1 below represents updates obtained or received from utility meter 10A. The flow information below is an exemplary table showing an exemplary utility meter reading update over the course of one day:

TABLE 1

| Time | Volume (Gallons) | Rate range (Gallons/Min.) |
|---|---|---|
| 12:00-1:00 a.m. | — | — |
| 1:00-2:00 a.m. | — | — |
| 2:00-3:00 a.m. | — | — |
| 3:00-4:00 a.m. | 1 | 0-0.25 |
| 4:00-5:00 a.m. | — | — |
| 5:00-6:00 a.m. | — | — |
| 6:00-7:00 a.m. | 10 | 0-1 |
| 7:00-8:00 a.m. | 20 | 0-5 |
| 8:00-9:00 a.m. | 30 | 2-3 |
| 9:00-10:00 a.m. | 10 | 0-1 |
| 10:00-11:00 a.m. | 10 | 0-1 |
| 11:00 a.m.-12:00 p.m. | 10 | 0-1 |
| 1:00-2:00 p.m. | 5 | 0-1 |
| 2:00-3:00 p.m. | 25 | 0-3 |
| 3:00-4:00 p.m. | 5 | 0-0.25 |
| 4:00-5:00 p.m. | 5 | 0-1 |
| 5:00-6:00 p.m. | 10 | 0-1 |
| 6:00-7:00 p.m. | 10 | 0-1 |
| 7:00-8:00 p.m. | 20 | 0-5 |
| 8:00-9:00 p.m. | — | — |
| 9:00-10:00 p.m. | — | — |
| 10:00-11:00 p.m. | — | — |
| 11:00 p.m.-12:00 a.m. | 1 | 0-1 |

As shown in Table 1, utility meter updates for determining meter usage include time, volume, rate range, and/or the like including updates to historical data, measurement data, flow rate information, or timing information.

For example, computer 20A captures and transmits one or more cloud-implemented utility meter updates. For example, the one or more cloud-implemented utility meter updates include updates to meter data related to utility meter 10A that are managed and processed in the cloud. The cloud, as previously explained, includes a cloud computer, cloud computer 40 may include one or more remote servers, one or more networks of servers, and/or the like that store and handle data and applications. In the cloud, cloud computer 40 stores, generates, and observes the utility meter updates. In other words, it manages the data associated with utility meters.

In some non-limiting embodiments or aspects, cloud computer 40 may store, generate, and/or determine cloud-implemented utility meter updates. The utility meter updates are based on one or more utility meter updates associated with a specific utility meter 10 (e.g., utility meters 10A-N in the above example, each active utility meter, each of the actively functioning utility meters 10A-N in the cloud can contribute to these cloud-implemented updates, etc.). The utility meter updates may include at least a volume measurement of fluid passing through utility meter 10 and a period of time associated with the volume measurement.

In some non-limiting embodiments or aspects, utility meter 10 may have been previously programmed or configured with a current profile generated by cloud computer 40 for the meter (e.g., expected behaviors profiles, etc.). For example, the previously generated current profile may indicate that during weekdays, water flow is highest in the morning and evening due to showers and household activities. Computer 20 may continuously monitor meter 10 for anomalies based on the prediction in the current profile that water flow is highest in the morning and evening due to showers and household activities. Simultaneously, computer 20 may perform updates.

In some non-limiting embodiments or aspects, computer 20 simultaneously monitors meter 20 for anomalies, compares sensed parameters of meter 10 with a current profile, while it measures (e.g., senses, etc.) operations of meter 10 to generate new meter information that can be used by the remote computer to generate an updated profile. Computer 20 may determine parameter updates for the current profile. In some examples, a profile update may be based on a difference between a current parameter and a previous parameter as it is identified in the current meter profile.

As shown in FIG. 3, at step 304, process 300 includes generating a utility meter profile based on the one or more utility meter updates. For example, in some non-limiting embodiments or aspects, cloud computer 40 generates a utility meter profile based on the one or more utility meter updates.

In some non-limiting embodiments or aspects, cloud computer 40 stores a utility meter update after receiving a utility meter update. In such an example, updates are influenced by the readings and measurements from individual utility meters (e.g., utility meter 10A-N). In some examples, cloud computer 40 may store the utility meter update in database 50 with other utility meter updates associated with the same utility meter 10. Cloud computer 40 may generate a meter profile, such as an average table, using the utility meter update. In another example, cloud computer 40 may generate a meter profile by summing a plurality of utility meter updates (e.g., historical data of utility meter 10), based on one or more measurements in the utility meter update. For example Table 2 below shows an exemplary utility meter profile for utility meter 10.

TABLE 2

| Time | Volume (Gallons) | Standard Deviation of Volume (Gallons) | Rate range (Gallons/ Min.) | Standard Deviation of Rate |
|---|---|---|---|---|
| 1:00-2:00 a.m. | 0.2 | 0.11 | 0-0.1 | 0.11 |
| 2:00-3:00 a.m. | 0.2 | 0.12 | 0-0.1 | 0.12 |
| 3:00-4:00 a.m. | 0.1 | 0.11 | 0-0.25 | 0.11 |
| 4:00-5:00 a.m. | 0.1 | 0.11 | 0-0.1 | 0.11 |
| 5:00-6:00 a.m. | 5 | 0.51 | 0-1 | 0.33 |
| 6:00-7:00 a.m. | 10 | 1.53 | 0-1 | 0.35 |
| 7:00-8:00 a.m. | 25 | 1.55 | 0-1.5 | 1.79 |
| 8:00-9:00 a.m. | 35 | 5.75 | 0-6.5 | 1.62 |
| 9:00-10:00 a.m. | 11 | 12.58 | 0-3 | 7.55 |
| 10:00-11:00 a.m. | 0.2 | 0.11 | 0-0.1 | 0.12 |
| 11:00-12:00 p.m. | 0.2 | 0.12 | 0-0.1 | 0.11 |
| 1:00-2:00 p.m. | 0.1 | 0.11 | 0-0.25 | 0.11 |

TABLE 2-continued

| Time | Volume (Gallons) | Standard Deviation of Volume (Gallons) | Rate range (Gallons/ Min.) | Standard Deviation of Rate |
|---|---|---|---|---|
| 2:00-3:00 p.m. | 1 | 0.11 | 0-0.1 | 0.33 |
| 3:00-4:00 p.m. | 5 | 0.51 | 0-1 | 0.35 |
| 4:00-5:00 p.m. | 5 | 1.53 | 0-1 | 1.79 |
| 5:00-6:00 p.m. | 10 | 1.55 | 0-1.5 | 1.62 |
| 6:00-7:00 p.m. | 10 | .75 | 0-1 | 0.36 |
| 7:00-8:00 p.m. | 10 | .53 | 0-1 | 0.12 |
| 8:00-9:00 p.m. | 0.5 | .05 | 0-.1 | 0.11 |
| 9:00-10:00 p.m. | 0.5 | .05 | 0-6.5 | 0.11 |
| 10:00-11:00 p.m. | 0.5 | .12 | 0-3 | 0.33 |
| 11:00-12:00 a.m. | 0.5 | .11 | 0-0.1 | 0.35 |

In some non-limiting embodiments or aspects, a row of a utility meter profile may include at least one measurement (e.g., a volume, a flow rate, a rate range, etc.) or calculated value (e.g., a standard deviation, an average deviation, a summation, etc.) associated with a period of time (e.g., 5 p.m.-6 p.m., etc.) in the utility meter 10. For example, the meter profile includes one or more indicators of water usage and one or more respective time periods for the one or more indicators.

In some non-limiting embodiments or aspects, utility meter profile includes information about the expected flow rate range for a particular building or application. This information can be calculated based on factors like the number of terminal water fittings in a building and the expected flow rate through the meter. In some examples, additional data sources may be integrated or liked to the profile. For example, weather information and the use of sonic signals to identify specific water usage patterns (e.g., toilets, sinks).

In some non-limiting embodiments or aspects, the utility meter profile may be generated by comparing a subset of meter updates of the plurality of utility meter updates to identify a historical trend of a volume of fluid passing through utility meter 10. For example, cloud computer 40 may determine a meter profile based on identifying (e.g., selecting, aggregating, finding, etc.) usage information associated with a historical trend associated with at least one period of time, a date, a season, a holiday, and/or the like, in order to dynamically determine if an abnormal condition (e.g., a slow leak, a line break, a burst pipe, an improper sized meter, etc.) has occurred. In another example, a historical trend may be further identified by calculating a standard deviation for any utility meter updates of utility meter 10 during a period of time.

In some non-limiting embodiments or aspects, an updated utility meter profile may be automatically generated. For example, a meter profile may be generated by cloud computer 40 based on at least one utility meter update received after a previously generated utility meter profile.

For example, when cloud computer 40 receives the updates from the utility meters, it performs tasks to determine anomalies. In addition, the cloud computer generates an updated utility meter profile (e.g., a new profile, changes to an existing profile, etc.).

In some non-limiting embodiments or aspects, cloud computer 40 parses or compares the received data, including flow rate measurements and other parameters with profile information. For example, cloud computer 40 compares the real-time flow rate data to the expected or programmed flow rate range, which is likely set to represent normal water usage patterns. Cloud computer 40 identifies anomalies or abnormal usage patterns based on the analysis. These anomalies could indicate leaks, unusual consumption, or other issues. Cloud computer 40 logs and stores this information for further action and analysis.

In some non-limiting embodiments or aspects, cloud computer 40 transmits profiles based on new readings. Periodically, cloud computer 40 generates utility meter profiles based on received updated profile data for detecting new anomalies or abnormal usage patterns. Such utility meter profiles may represent a summary of the meter's performance and any identified issues. For example, cloud computer 40 generates profiles which may include information for detecting water consumption trends, potential leaks, or irregular consumption patterns. In such an example, cloud computer 40 transmits the profiles back to the respective utility meters (e.g., utility meter 10A) from which the data originated.

In some non-limiting embodiments or aspects, the timing of profile transmission is based on one or more predefined intervals or triggers. For example, cloud computer 40 transmits an updated meter profile to utility meters on a daily, a weekly, or a monthly basis. Profiles may also be sent immediately when significant anomalies or abnormal usage patterns are detected to alert users or utilities to potential issues.

In some non-limiting embodiments or aspects, updates from utility meters are periodically sent to cloud computer 40, where updates may also be used to detect anomalies or abnormal usage patterns. In some examples, cloud computer 40 parses updates to generate updates to utility meter profiles. The timing of profile transmission can vary, depending whether regular intervals or triggers for significant events are activated. The utility meter profiles provide detectable information for monitoring and managing water usage efficiently and addressing potential problems promptly.

As shown in FIG. 3, at step 306, process 300 includes receiving a utility meter profile. For example, in some non-limiting embodiments or aspects, computer 20A receives or obtains a utility meter profile (e.g., a database, a file, a message, an arrangement of values, etc.).

In some non-limiting embodiments or aspects, cloud computer 40 transmits the updated meter profile. Cloud computer 40 may then store and/or transmit the utility meter profile to computer 20A of utility meter 10A. For example, cloud computer 40 automatically transmits the utility meter profile, such as, for example, on a predetermined schedule or interval. As an example, cloud computer 40 transmits a utility profile after generating a utility profile.

In some non-limiting embodiments or aspects, ultrasonic water meters are equipped with electronic registers that store measurement data, including flow rate.

The electronic register (e.g., register 170 of FIG. 1) provides a digital interface for accessing and retrieving data. Water meter 10 may continuously monitor the flow rate of water in real-time. In addition, water meter 10 may continuously compare it to the expected flow rate range programmed into the microprocessor. In some examples, meter settings are customized (e.g., with a predetermine setting, time, condition, etc.) to determine how frequently data is logged and transmitted. Customizable intervals allow utility operators to optimize data collection based on their specific needs.

In some non-limiting embodiments or aspects, data logging capabilities are integrated into meter 10. This allows the meter to record data at specified intervals. The data logs typically include flow rate measurements. The data logs may also include other parameters like temperature and pressure. Some meters 10 may have substantial data storage capacity, allowing them to store a large amount of historical data.

In some non-limiting embodiments or aspects, external systems (e.g., outside the cloud, connected to the cloud, etc.) may access flow rate data in real-time. This provides utilities capabilities to monitor water usage continuously. This is particularly important for improving leak detection and identifying irregular water consumption patterns.

The cloud computer may also include additional information in the profile (e.g., may transmit information to meter 10 in addition to the profile, included in the profile, etc.). For example, cloud computer 40 may transmit firmware updates to the utility meter so that the meter's operating system or software remains up to date with the latest features and improvements. In another example, cloud computer 40 may execute configuration changes. For example, a utility company may need to make changes to a configuration of the utility meters remotely. In such an example, a utility company may adjust the frequency of data logging or change alert thresholds. These updates are sent from the cloud computer to the meter. In some non-limiting embodiments or aspects, alerts and notifications are transmitted by a utility company (e.g., cloud computer 40, etc.). For example, when cloud computer 40 detects irregularities in water usage, cloud computer 40 transmits alerts or notifications to the utility meters. For example, if a potential leak is detected, an alert can be sent to the meter for further action. In some examples, consumption summaries are transmitted to utility meters from the cloud computer. Such examples illustrate the bidirectional communication between utility meters and cloud computers, allowing for data collection, analysis, and management in an improved water management system.

As shown in FIG. 3, at step 308, process 300 includes automatically determining an abnormality of the utility meter by comparing the utility meter usage profile to a measured flow of water through utility meter 10. For example, in some non-limiting embodiments or aspects, computer 20 automatically determines an abnormality of utility meter 10 by comparing the utility meter usage profile to a real time measurement of a flow of water through utility meter 10. Computer 20A-N compares the real-time data it collects with the expected behavior profiles. For example, computer 20A-N checks if the current data aligns with what is typical for that time of day, day of the week, or season of the year.

Utility meter 10 may determine from the utility meter usage profile a range of flow rates that are considered normal or expected for the specific conditions it is installed in. For example, utility meter 10 continuously checks the current flow rate of water against this expected range. If the actual flow rate falls within the expected range, there is no cause for concern, and utility meter 10 continues its normal operation. However, if the measured flow rate deviates significantly from this expected range, it is considered abnormal, and utility meter 10 may flag it as an anomaly. This information may be returned to cloud computer 40. In such an example, cloud computer 40 may use the notification (e.g., including the flag, etc.) for detecting unusual patterns of water usage, which could be indicative of leaks, malfunctions, or other issues in the water supply system.

In some non-limiting embodiments or aspects, computer 20 may measure a volume of water flowing through utility meter 10 and determine a leak or other abnormal condition of utility meter 10 by comparing the measured parameter (e.g., volume, etc.) to an entry in the utility profile. In this way, the utility meter may predict an expected volume of water for the associated time period. If the meter detects data that deviates significantly (e.g., within a predetermined threshold of 1%, 5%, 10%, etc.) from the expected behavior profile, it flags this as an anomaly. Anomalies may include abnormally high flow rates during non-peak times, prolonged periods of continuous flow when there should be none, or other unusual patterns.

In some examples, the updated meter profile is received, stored, and/or automatically updated in utility meter 10A when received at utility meter 10A. As an example, utility meter 10A is configured to store the update to the utility meter profile in memory accessible by computer 20A for determining an abnormality in utility meter 10.

In some non-limiting embodiments or aspects, a profile is transmitted to utility meter 10, and then loaded into computer 20 and/or stored in database 30. Programming instructions stored in computer 20 can be executed to detect abnormalities in utility usage based on the utility meter profile.

In some non-limiting embodiments or aspects, computer 20 (e.g., a microprocessor of computer 20, one or more processors of computer 20, etc.) determines an abnormality based on an actual volume of water flowing through a meter body. As an example, computer 20 determines a flow rate that exceeds a value in the utility profile associated with a time of the measured flow rate. For example, computer 20 may determine an abnormality by determining that no amount of consumption has occurred, an amount of consumption that is outside a range (e.g., a standard deviation, a mean, etc.) has occurred, or an amount of consumption outside a discrete value associated with utility meter 10 has occurred. A consumption may be determined to be outside a range if the usage is outside a standard deviation of the mean usage of water for a period of the historical trend (e.g., 5 p.m. to 6 p.m. on Saturday, etc.). For example, as shown in Table 1, in a period from 2:00 p.m.-3:00 p.m., a utility meter update shows that 25 gallons of water were used. In such an example, computer 20 of utility meter 10 determines a reading during that time that was outside a range and an amount of water usage (e.g., 25 gallons) is abnormal based on the utility profile that shows an average volume (e.g., 1 gallon) associated with a low standard deviation (e.g., 0.11 gallons). In a further example, computer 20 may additionally and/or alternatively determine that a flow rate (e.g., 3 gallons) is outside a range (e.g., 0-0.1 gallons/minute) with a standard deviation (e.g., 0.33).

In some non-limiting embodiments or aspects, cloud computer 40 determines an abnormality based on meter information for an entire neighborhood through a collective analysis of data from multiple meters. For example, cloud computer 40 creates a baseline consumption profile for the entire neighborhood by aggregating data received from all meters 10. This profile represents typical water consumption patterns for that area, accounting for factors like time of day, day of the week, weather conditions, and seasonal variations. Then, by continuously monitoring the water usage of individual meters within the neighborhood, cloud computer 40 can compare each meter's usage patterns to the established baseline profile. Deviations from the expected neighborhood consumption can be flagged as potential anomalies. Statistical and machine learning algorithms may identify significant deviations or anomalies in individual meter readings. These anomalies could indicate leaks, excessive water usage, or irregular patterns. In addition to individual anomaly detection, by comparing the usage patterns of neighboring meters, cloud computer 40 may determine that one meter shows a significant deviation from its neighbors, and it might suggest a localized issue, such as a leak or water wastage within that property. Also, cloud computer 40 may cross-validate anomaly alerts by comparing data from multiple meters within the same area. If several nearby meters report similar anomalies, the likelihood of a genuine issue is given more weight.

In some non-limiting embodiments or aspects, computer 20 may differentiate between various water fixtures or appliances in a building, such as toilets, sinks, and washing machines, based on the unique acoustic signatures they produce when water flows through them to identify specific water usage patterns (e.g., toilets, sinks). For example, when water flows through a toilet, it creates a distinct sound pattern that is different from the sound produced when water is used in a sink or washing machine. By analyzing these sonic signals, the system can determine which fixture is currently in use and whether there might be a leak or abnormal water usage associated with that fixture.

In addition to the examples mentioned, there are several other unusual patterns that utility meter 10 may predict or flag as anomalies. For example, computer 20 may determine sudden spikes in usage. For example, computer 20 may determine a significant and sudden increase in water consumption over a short period of time. In such an example, computer 20 (or cloud computer 40) may determine based on the meter profile that the water consumption is unrelated to known activities like filling a swimming pool, watering a lawn, or irrigating a property. In such an example, computer 20 (or cloud computer 40) may activate an alert or notification that could indicate a burst pipe or malfunction.

In some non-limiting embodiments or aspects, computer 20 (or cloud computer 40) may determine inconsistent flow. In another example, computer 20 (or cloud computer 40) may determine variations in flow rates that don't align with typical usage patterns (e.g., determined by comparing to a meter profile, etc.) and may indicate irregular water usage or even tampering with the meter. In another example, computer 20 (or cloud computer 40) may determine reverse flow, such as an unexpected reversal of flow direction, where water flows backward through the meter due to a backflow issue or a defect in the meter. In another example, computer 20 (or cloud computer 40) may determine nocturnal usage, such as unusual patterns of water consumption during nighttime hours caused by leaks or unauthorized water use when the property should be dormant. In another example, computer 20 (or cloud computer 40) may determine low or no usage in a normally occupied property, such as a sudden drop in water usage in a property that is typically occupied. This could indicate a problem like a water shutoff due to unpaid bills, vacant property, or plumbing issues. In another example, computer 20 (or cloud computer 40) may determine consistently low flow when the meter consistently reports very low or minimal flow rates. This can indicate a blockage or partial obstruction in the water supply line. In another example, computer 20 (or cloud computer 40) may determine pattern deviations from a property's historical usage patterns, including deviations that occur suddenly or at an unusual time. For example, if a household's water usage has been relatively stable for months and then suddenly spikes or drops significantly, it could indicate a problem. In another example, computer 20 (or cloud computer 40) may determine meter tampering when attempts to tamper with the meter or manipulate its readings are detected and flagged as anomalies. In another example, computer 20 (or cloud computer 40) may determine inconsistent data or gaps in the data reported by the meter, such as missing readings or data irregularities, considered unusual. In another example, computer 20 (or cloud computer 40) may determine based on the absence of an alarm signal transmitted by the water meter that the installed meter is the correct size and that the flow rate is within the expected range. In another example, computer 20 (or cloud computer 40) may determine inconsistent data related to an unexplained continuous flow reported by the meter when there should be none, such as when all taps and appliances are turned off, that could indicate a leak or malfunction.

In some non-limiting embodiments or aspects, when such anomalies are detected, they can trigger alerts or notifications to the property owner or the utility company, directing them to investigate or take urgent steps to address potential utility issues promptly.

As shown in FIG. 3, at step 310, process 300 includes sending an alert. For example, in some non-limiting embodiments or aspects, computer 20 sends an alert. As an example, computer 20 may determine an abnormality or deviation in the data from utility meter 10 based on the utility profile, and in response to determining an abnormality, may send an alert or notification. For example, an alert includes at least one of sending an alert to notify a user of utility meter 10, sending an alert to notify a utility, controlling a valve to stop passage of water, sending a message to utility company, updating a log, updating a profile, and/or the like.

In some non-limiting embodiments or aspects, when the measured flow rate exceeds the maximum expected flow rate, cloud computer 40 triggers an alert. The criteria for triggering the alert can be customized and may include factors like the frequency, duration, or intensity of flow rate exceedances.

In some non-limiting embodiments or aspects, computer 20 sends the alert to a utility (e.g., water company, electric company, etc.) to inform the utility of a problem. In some non-limiting embodiments or aspects, the alert may be sent to a consumer or user. The alert may include diagnostic information associated with the abnormality, and/or other information, such as a volume of water, usage information, and/or the like. The alert may be in the form of a text message, email, or some other message or communication that can be sent to a monitored address, such as an address associated with a server operated by a utility that is programmed to respond to an alert. In some examples, computer 20 may make a determination based on information included in the alert. The alert may further include sounding an alarm at or near utility meter 10, an alert placing an indicator in a viewable screen of meter 10 to flag a diagnostic or other action to take when servicing the meter, and/or the like.

In some non-limiting embodiments or aspects, meter 10 may transmit a signal that causes cloud computer 40 to generate an alert. For example, meter 10 may detect an anomaly based on the meter profile from the cloud computer 40. Meter 10 may transmit an alert signal through the meter's communication system. This alert can take the form of a signal transmitted by an antenna or across the public network.

In some non-limiting embodiments or aspects, computer 20 may be programmed or configured to control a valve to stop water from passing through the valve. For example, computer 20 may automatically close a valve V as shown in FIG. 1 by sending an instruction or directly controlling a motor configured to close Valve V in response to a detected abnormality in the flow of water. In this way, a leakage or other abnormality can be contained or avoided in real time based on the utility meter profile.

In some non-limiting embodiments or aspects, external monitoring or alert systems, such as those used by utility companies or building management to manage consumers, may receive or obtain the signals from the water meters. In some examples, data related to flow rate anomalies and meter sizing may be logged for future analysis and record-keeping. Water meters may continuously monitor flow rates, ensuring that any deviations from the expected flow rate range be promptly detected and communicated. Flow rate data may be seamlessly integrated with utility management systems and billing platforms, streamlining the billing process and improving overall management efficiency.

In some non-limiting embodiments or aspects, a signal from meter 10 may be in a form of a digital signal or message sent to a central system or cloud computer 40. It may also include information about the nature of the anomaly.

For example, the meter communicates with a central system or cloud computer 40, and provides details about the detected anomalies. This communication is typically achieved through wireless or wired connections, such as cellular networks or Wi-Fi. Cloud computer 40 receives the anomaly data from one or more meters. It then determines from the data, or from collective data, to confirm the anomaly and assess its severity. Depending on the severity of the anomaly, cloud computer 20 may also trigger alerts to relevant stakeholders. For example, if a potential water leak is detected, an alert can be sent to the water utility company, the consumer, other escalated contacts, each of the above, and/or the like.

In some non-limiting embodiments or aspects, once alerted, stakeholders may take appropriate action to address an anomaly. For example, if it is a suspected leak, the water utility may dispatch a technician for inspection and repair. Consumers may also be informed of the issue and advised on steps to mitigate it.

Utility meter 20 continues to monitor data and generate alerts as necessary. Cloud computer 40 updates profiles and settings to adapt to changing usage patterns and improve anomaly detection accuracy. In some non-limiting embodiments or aspects, meter 10 is a remote control water meter. For example, cloud computer 40 has the capability to manipulate or manage water meters from a distant location, typically through a digital or remote control interface. Water meters are devices that measure the amount of water consumed in a building or system.

Figure 4:
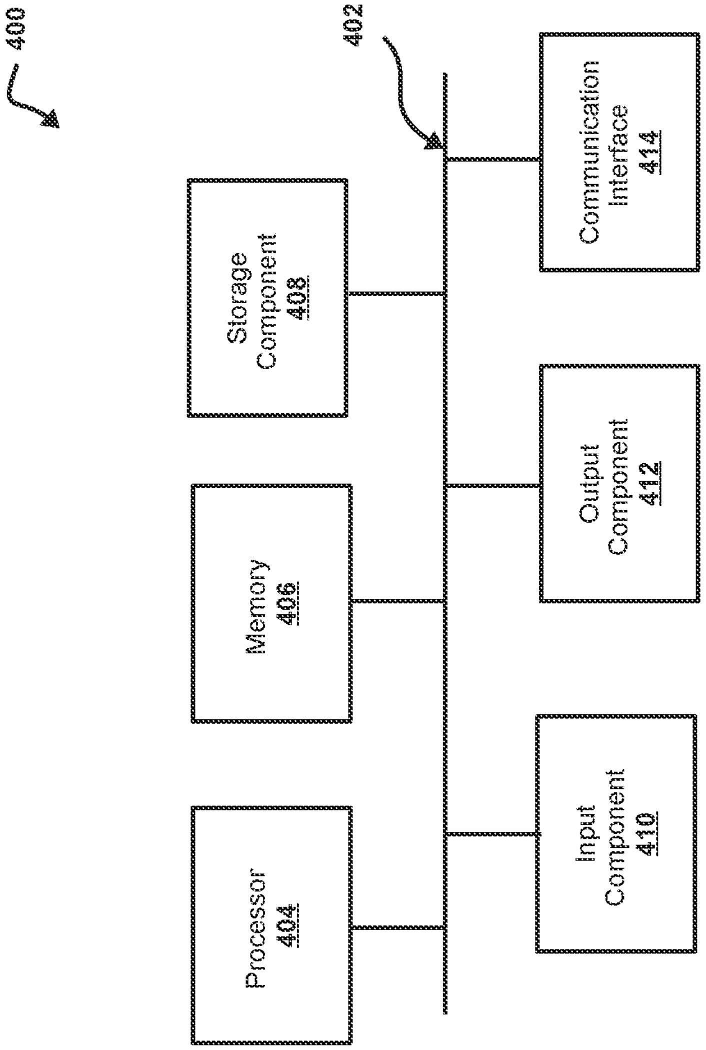
FIG. 4 is a diagram of a non-limiting embodiment or aspect of the components of one or more devices and/or one or more systems of FIGS. 1 and 2 usage.

FIG. 4 provides a diagram of example components of device 400. Device 400 can correspond to one or more devices of computer 20, one or more devices of a system of utility meter 10, one or more devices of cloud computer 40 (e.g., one or more devices of a remote server, etc.), and/or the like. In some non-limiting embodiments or aspects, one or more devices of utility meter 10, computer 20, cloud computer 40, and/or the like, may include at least one device 400 and/or at least one component of device 400. As shown in FIG. 4, device 400 includes bus 402, processor 404, memory 406, storage component 408, input component 410, output component 412, and communication interface 414 for some non-limiting embodiments or aspects of detecting utility usage abnormalities.

Bus 402 includes a component that permits communication among the components of device 400. In some non-limiting embodiments or aspects, processor 404 is implemented in hardware, firmware, or a combination of hardware and software. For example, processor 404 includes a processor (e.g., a central processing unit (CPU), a graphics processing unit (GPU), an accelerated processing unit (APU), etc.), a microprocessor, a digital signal processor (DSP), and/or any processing component (e.g., a field-programmable gate array (FPGA), an application-specific integrated circuit (ASIC), etc.) that can be programmed to perform a function. Memory 406 includes a random access memory (RAM), a read only memory (ROM), and/or another type of dynamic or static storage device (e.g., flash memory, magnetic memory, optical memory, etc.) that stores information and/or instructions for use by processor 404.

Storage component 408 stores information and/or software related to the operation and use of device 400. For example, storage component 408 includes a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 410 includes a component that permits device 400 to receive information, such as via user input (e.g., a touch screen display, a keyboard, a keypad, a mouse, a button, a switch, a microphone, etc.). Additionally, or alternatively, input component 410 includes a sensor for sensing information (e.g., a global positioning system (GPS) component, an accelerometer, a gyroscope, an actuator, etc.). Output component 412 includes a component that provides output information from device 400 (e.g., a display, a speaker, one or more light-emitting diodes (LEDs), etc.).

Communication interface 414 includes a transceiver-like component (e.g., a transceiver, a separate receiver and transmitter, etc.) that enables device 400 to communicate with other devices, such as via a wired connection, a wireless connection, or a combination of wired and wireless connections. Communication interface 414 can permit device 400 to receive information from another device and/or provide information to another device. For example, communication interface 414 includes an Ethernet interface, an optical interface, a coaxial interface, an infrared interface, a radiofrequency (RF) interface, a universal serial bus (USB) interface, a Wi-Fi interface, a cellular network interface, and/or the like.

Device 400 can perform one or more processes described herein. Device 400 can perform these processes based on processor 404 executing software instructions stored by a computer-readable medium, such as memory 406 and/or storage component 408. A computer-readable medium (e.g., a non-transitory computer-readable medium) is defined herein as a non-transitory memory device. A memory device includes memory space located inside of a single physical storage device or memory space spread across multiple physical storage devices.

Software instructions can be read into memory 406 and/or storage component 408 from another computer-readable medium or from another device via communication interface 414. When executed, software instructions stored in memory 406 and/or storage component 408 cause processor 404 to perform one or more processes described herein. Additionally, or alternatively, hardwired circuitry can be used in place of or in combination with software instructions to perform one or more processes described herein. Thus, embodiments described herein are not limited to any specific combination of hardware circuitry and software.

Memory 406 and/or storage component 408 may include data storage or one or more data structures (e.g., a database, etc.). Device 400 may be capable of receiving information from, storing information in, communicating information to, or searching information stored in the data storage or one or more data structures in memory 406 and/or storage component 408. In some non-limiting embodiments or aspects, the information may include data (e.g., meter data, usage data, user data etc.) associated with one or more utility meters and/or users of utility meters.

The number and arrangement of components shown in FIG. 4 are provided as an example. In some non-limiting embodiments or aspects, device 400 includes additional components, fewer components, different components, or differently arranged components than those shown in FIG. 4. Additionally, or alternatively, a set of components (e.g., one or more components) of device 400 can perform one or more functions described as being performed by another set of components of device 400.

Figure 5:
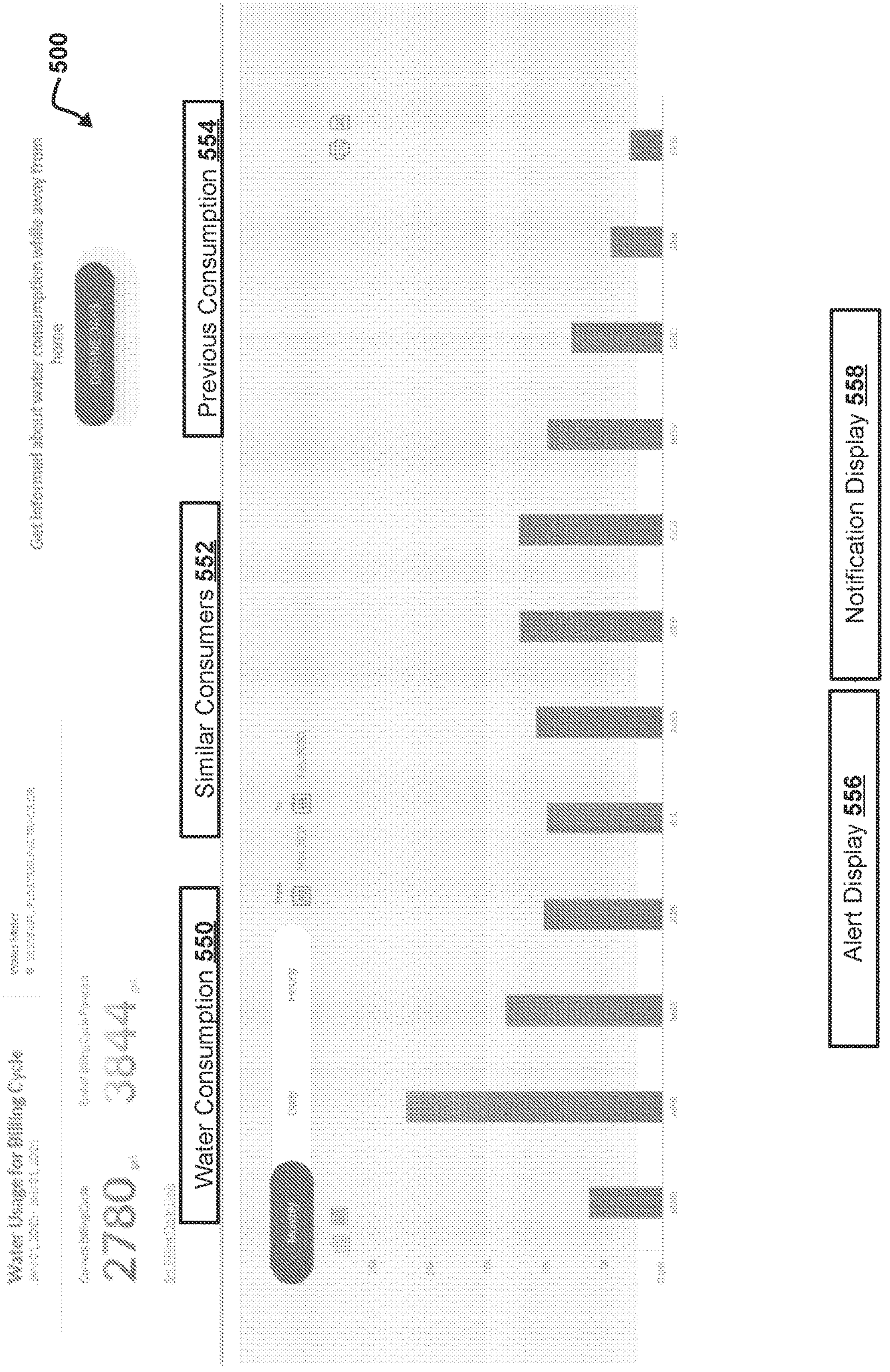
FIG. 5 is a visualization of a non-limiting embodiment or aspect of an exemplary water advisory page.

Referring now to FIG. 5, a utility advisory dashboard 500 is shown. The utility advisory dashboard 500 may be used in the context of utility meter systems and water usage monitoring to aid in the detection, prevention, and resolution of anomalies.

In some non-limiting embodiments or aspects, utility advisory dashboard 500, during the registration process, provides account number and matching to the water bill. The main dashboard provides water consumption 550 for accessing an overview of water consumption, including average monthly consumption and household usage.

In some non-limiting embodiments or aspects, utility advisory dashboard 500 may provide water consumption 550, similar consumers 552, and previous consumption 554 to configure and display consumption details, metrics, and/or the like.

Anomalies related to leaks, such as continuous high water usage, water usage when no one is home, and/or the like, may be communicated through alert display 556 and notification display 558. In some non-limiting embodiments or aspects, the exact user interface design and placement of elements may vary depending on the specific implementation of the application.

In some non-limiting embodiments or aspects, utility advisory dashboard 500 provides alert display 556 (e.g., anomaly alerts, leak alerts, consumption alerts, etc.) for configuring alerts and displaying active alerts. For example, utility advisory dashboard 500 provides alerts for anomalies, such as suspected leaks or unusually high daily usage. To access active alerts from alert display 556, users may navigate to the alerts section, via the application's main menu or dashboard of utility advisory dashboard 500. Users may also set consumption limits and receive alerts in alert display 556. This information can be used to detect and display anomalies in alert display 556 when a user's consumption exceeds their set limits or shows unusual patterns. In addition, actions or recommendations to resolve the alerts (or notifications) may be provided.

In some non-limiting embodiments or aspects, utility advisory dashboard 500 provides notification display 558 (e.g., notifications, water usage notifications, consumption notifications, etc.) for configuring notifications and displaying active notifications. Notifications are displayed to consumers via notification display 558 to prevent potential issues from occurring and prevent water wastage.

In some non-limiting embodiments or aspects, one or more real-time alert settings can be generated in alert display 556. For example, alert display 556 may display an alert based on personal or customized alert settings, including settings for suspected leak alerts. For example, alert display 556 displays one or more customized (e.g., personalized, etc.) alert settings to allow users to define and track an anomaly for their specific usage patterns.

Notification display 558 displays one or more customized (e.g., personalized, etc.) notification settings to allow users to define and track their specific usage patterns. Alerts or notifications may then be generated based on patterns detected in the user's water consumption data. For example, alerts may be triggered if the system detects a significant and sudden increase in water usage that is not typical for the user's household. In some examples, when an alert is generated, users are sent a notification through their chosen communication channels (email, SMS, in-app notifications) to notify one or more users of an alert.

In such an example, utility advisory dashboard 500 continuously monitors consumption patterns and, if it identifies a deviation from the norm, it may trigger a suspected leak alert.

In some non-limiting embodiments or aspects, a comparative monthly average is provided. For example, utility advisory dashboard 500 displays a comparative monthly average that helps users identify anomalies when their current month's consumption significantly differs from their historical averages. Utility advisory dashboard 500 provides mobile applications for users to select monitoring to receive real-time alerts and notifications. Providing consumption charts and tables for different timeframes allows users to review historical data for anomalies, helping them understand their usage patterns better and aids in anomaly detection and prevention by providing users with capability to monitor their water consumption, set alerts, and take action when anomalies are detected and provides tools for resolving issues related to water anomalies effectively. Machine learning models may analyze more complex patterns, taking into account factors like time of day, historical data, weather conditions, and other variables.

This written description uses examples to disclose the invention and enable a person of ordinary skill in the relevant art to make and practice the invention, including making and using any devices or systems and performing any incorporated methods. The patentable scope of the invention is defined by the claims. Such other examples are within the scope of the claims if they have structural elements that do not differ from the literal language of the claims, or if they include equivalent structural elements with insubstantial differences from the literal languages of the claims. Aspects from the various embodiments described, as well as other known equivalents for each such aspects, can be mixed and matched by one of ordinary skill in the art to construct additional embodiments and techniques in accordance with the principles of this application.

What is claimed is:

1. A cloud-implemented method of determining a utility meter abnormality, the method comprising:

receiving, at a profile sharing server comprising one or more processors, from a utility meter, a plurality of utility meter updates;

generating, by the one or more processors of the profile sharing server, a utility meter profile based on one or more utility meter updates of the plurality of utility meter updates;

transmitting, from the profile sharing server to the utility meter, the generated utility meter profile;

receiving, at the utility meter, from the profile sharing server, the utility meter profile;

automatically determining, at the utility meter, a utility meter abnormality by comparing the utility meter profile to a measured flow rate of fluid through the utility meter; and in response to determining the utility meter abnormality, sending an alert.

2. The cloud-implemented method of claim 1, wherein the one or more utility meter updates comprises historical data contained by the utility meter including at least one of a volume of fluid passing through the utility meter and a time associated with a volume measurement.

3. The cloud-implemented method of claim 1, wherein the utility meter profile includes a time a measurement was made to determine the one or more utility meter updates.

4. The cloud-implemented method of claim 1, wherein generating the utility meter profile comprises:

determining a subset of utility meter updates of the plurality of utility meter updates to identify a historical trend of a volume of fluid passing through the utility meter; and determining the utility meter profile identifying usage information associated with the subset of utility meter updates.

5. The cloud-implemented method of claim 4, wherein the historical trend is associated with at least one interval of a time, a date, a season, a holiday, or a time period and is based on a standard deviation of the plurality of utility meter updates during the associated interval.

6. The cloud-implemented method of claim 5, wherein sending the alert includes at least one of: sending an alarm to a user of the utility meter, sending an alarm to a utility company, controlling a valve to stop passage of fluid, sending a message to the utility company, updating a log, or updating a utility meter profile.

7. The cloud-implemented method of claim 6, wherein sending the alert comprises:

determining no amount of consumption; or determining an amount of consumption is outside of a range.

8. The cloud-implemented method of claim 7, wherein the consumption is outside of the range if the usage is outside of a standard deviation of a mean usage for the interval of the historical trend.

9. The cloud-implemented method of claim 1, further comprising:

sending, by the utility meter to the profile sharing server, the plurality of utility meter updates for determining a plurality of utility meter usage updates associated with a volume of fluid passing through the utility meter.

10. The cloud-implemented method of claim 9, wherein the utility meter profile includes one or more indicators of usage and one or more respective intervals for the one or more indicators, wherein the utility meter profile is loaded or stored into the utility meter, and further wherein executes programming instructions stored in the utility meter to detect the abnormalities in utility usage based on the utility meter profile.

11. The cloud-implemented method of claim 1, comprising:

automatically generating an updated utility meter profile based on at least one utility meter update received after a previously generated utility meter profile.

12. A utility meter comprising a register and a meter body, wherein the register is positioned on or in the meter body to measure a volume of fluid passing through the meter body, wherein the register comprises a register body, a clock, a memory, and a microprocessor disposed within the register body, the microprocessor further configured to:

determine a flow rate of fluid passed through a meter body;

send, from a utility meter to a profile sharing server comprising one or more processors, a plurality of utility meter updates, including a flow rate of fluid;

receive, from the profile sharing server, a utility meter profile generated by the profile sharing server based on one or more utility meter updates of the plurality of utility meter updates;

store, at the utility meter, the utility meter profile for use by the microprocessor in executing programming instructions at the utility meter to detect one or more abnormalities in utility usage;

automatically determine, by the microprocessor of the utility meter, the one or more abnormalities of the utility meter by comparing the received utility meter profile to the flow rate of fluid passed through the utility meter;

issue a signal to indicate the measured volume of fluid passed through the meter body is abnormal; and transmit the signal issued by the microprocessor.

13. The utility meter of claim 12, wherein the microprocessor determines whether the flow rate of fluid passed through the utility meter exceeded a range for a flow rate value of the utility meter profile associated with an interval of a historical trend.

14. The utility meter of claim 12, wherein the one or more utility meter updates comprises historical data contained by the utility meter including at least one of a volume of fluid passing through the utility meter and a time associated with the volume measurement.

15. The utility meter of claim 12, wherein generating the utility meter profile comprises:

determining a subset of utility meter updates of the plurality of utility meter updates that identify a historical trend of the volume of fluid passing through the utility meter; and determining the utility meter profile identifying usage information associated with the subset of utility meter updates.

16. The utility meter of claim 15, wherein the historical trend is associated with at least one interval of a time, a date, a season, a holiday, or a time period and is based on a standard deviation of the plurality of utility meter updates during the associated interval.

17. The utility meter of claim 16, wherein transmitting the signal includes at least one of: sending an alarm to a user of the utility meter, sending an alarm to a utility company, controlling a valve to stop passage of fluid, sending a message to the utility company, updating a log, or updating a utility meter profile.

18. The utility meter of claim 17, wherein the microprocessor further configured to:

determine no amount of consumption; or determine an amount of consumption is outside of a range.

19. The utility meter of claim 18, wherein the consumption is outside of the range if the usage is outside of a standard deviation of a mean usage for the interval of the historical trend.

20. A non-transitory computer-readable medium having instructions stored thereon that, when executed by at least one computing device, cause the at least one computing device to:

determine a flow rate of fluid passed through a meter body;

send, from a utility meter to a profile sharing server comprising one or more processors, a plurality of utility meter updates, including a flow rate of fluid;

receive, at the utility meter from the profile sharing server, a utility meter profile generated by the profile sharing server based on one or more utility meter updates of the plurality of utility meter updates;

store, at the utility meter, the utility meter profile for use by a microprocessor of the utility meter in executing programming instructions to detect one or more abnormalities in utility usage;

automatically determine the one or more abnormalities of the utility meter by comparing the received utility meter profile to the flow rate of fluid passed through the utility meter;

issue a signal to indicate a measured volume of fluid passed through the meter body is abnormal; and transmit the signal issued by a microprocessor.

* * * * *